United States Patent
Giustina et al.

(10) Patent No.: US 8,639,248 B2
(45) Date of Patent: Jan. 28, 2014

(54) HANDOVER INFORMATION SENT OVER A PUBLIC WIDE AREA NETWORK (E.G. INTERNET)

(75) Inventors: Andrea Giustina, Milan (IT); Richard Byrne, Thatcham (GB)

(73) Assignee: Ubiquisys Limited, Swindon (GB)

( * ) Notice: Subject to any disclaimer, the term of this patent is extended or adjusted under 35 U.S.C. 154(b) by 170 days.

(21) Appl. No.: 11/664,362

(22) PCT Filed: Jul. 28, 2006

(86) PCT No.: PCT/GB2006/002820
§ 371 (c)(1),
(2), (4) Date: Aug. 12, 2008

(87) PCT Pub. No.: WO2007/015068
PCT Pub. Date: Feb. 8, 2007

(65) Prior Publication Data
US 2009/0190550 A1    Jul. 30, 2009

(30) Foreign Application Priority Data

Aug. 1, 2005 (GB) .................................. 0515888.6
May 30, 2006 (GB) .................................. 0610650.4

(51) Int. Cl.
*H04W 36/00*    (2009.01)

(52) U.S. Cl.
USPC ............................ 455/436; 455/444; 370/331

(58) Field of Classification Search
USPC ................ 455/435.1, 436–444, 432.1, 435.2, 455/435.3, 447–449; 370/331, 328, 338
See application file for complete search history.

(56) References Cited

U.S. PATENT DOCUMENTS

| | | | |
|---|---|---|---|
| 5,343,512 A * | 8/1994 | Wang et al. | 455/410 |
| 5,438,608 A | 8/1995 | Kojima | |
| 5,778,322 A | 7/1998 | Rydbeck | |
| 5,794,157 A | 8/1998 | Haartsen | |
| 6,014,563 A | 1/2000 | Szabo | |
| 6,169,798 B1 * | 1/2001 | Ishikawa | 379/265.02 |
| 6,236,859 B1 | 5/2001 | Morper | |
| 6,359,871 B1 * | 3/2002 | Chung et al. | 370/338 |

(Continued)

FOREIGN PATENT DOCUMENTS

| | | |
|---|---|---|
| DE | 19633925 A1 | 3/1998 |
| EP | 0766427 | 4/1997 |

(Continued)

OTHER PUBLICATIONS

Examination Report dated Sep. 12, 2008 for related European Patent Application No. 06 765 153.9-2412.

(Continued)

*Primary Examiner* — San Htun
*Assistant Examiner* — Magdi Elhag
(74) *Attorney, Agent, or Firm* — Weaver Austin Villeneuve & Sampson LLP

(57) ABSTRACT

A basestation (50) in a mobile communications network is connected to the core network of the mobile communications network over a public wide area network. In the event of a handover between the basestation and another of the network nodes of the PLMW (120), handover information (130, 132, 134) is sent between the basestation and the core network over the public wide area network, for example embedded in a SIP message or in a UMA message.

43 Claims, 15 Drawing Sheets

(56) References Cited

U.S. PATENT DOCUMENTS

| | | | |
|---|---|---|---|
| 6,615,035 | B1 | 9/2003 | Lucidarme et al. |
| 6,628,949 | B1 * | 9/2003 | Park .............................. 455/436 |
| 6,711,417 | B1 * | 3/2004 | Gorman et al. ............ 455/550.1 |
| 6,831,903 | B2 * | 12/2004 | Kang ............................. 370/328 |
| 6,901,061 | B1 | 5/2005 | Joo et al. |
| 6,993,359 | B1 * | 1/2006 | Nelakanti et al. .......... 455/554.1 |
| 7,085,260 | B2 * | 8/2006 | Karaul et al. ................ 370/352 |
| 7,120,135 | B2 * | 10/2006 | Kim ............................. 370/329 |
| 7,437,465 | B2 * | 10/2008 | Rousseau ...................... 709/227 |
| 2001/0044305 | A1 | 11/2001 | Reddy et al. |
| 2002/0191561 | A1 | 12/2002 | Chen et al. |
| 2003/0058818 | A1 * | 3/2003 | Wilkes et al. ................ 370/331 |
| 2003/0119489 | A1 | 6/2003 | Mohammed |
| 2004/0017786 | A1 | 1/2004 | Shively |
| 2004/0114734 | A1 * | 6/2004 | Yoon et al. ................. 379/90.01 |
| 2004/0204097 | A1 | 10/2004 | Scheinert et al. |
| 2005/0037766 | A1 | 2/2005 | Hans et al. |
| 2005/0088999 | A1 | 4/2005 | Waylett et al. |
| 2005/0090259 | A1 * | 4/2005 | Jain et al. ..................... 455/439 |
| 2005/0282544 | A1 * | 12/2005 | Oommen et al. .......... 455/432.1 |
| 2006/0052085 | A1 | 3/2006 | Gregrio et al. |
| 2006/0095954 | A1 * | 5/2006 | Buckley et al. ................... 726/2 |
| 2006/0116127 | A1 * | 6/2006 | Wilhoite et al. ............. 455/442 |
| 2007/0242640 | A1 * | 10/2007 | Uchida et al. ................ 370/335 |
| 2009/0170519 | A1 * | 7/2009 | Wilhoite et al. ............. 455/436 |

FOREIGN PATENT DOCUMENTS

| | | |
|---|---|---|
| EP | 1 032 236 A1 | 8/2000 |
| EP | 2 116 082 B1 | 9/2012 |
| GB | 2 355 885 | 5/2001 |
| JP | 2007-524278 | 8/2007 |
| WO | WO 02/054820 | 7/2002 |
| WO | WO 02/063900 | 8/2002 |
| WO | WO 02/093811 | 11/2002 |
| WO | WO 03/061177 | 7/2003 |
| WO | WO 03/084096 | 10/2003 |
| WO | WO 03/085992 A1 | 10/2003 |
| WO | WO 03/090013 | 10/2003 |
| WO | WO2004/086788 | 10/2004 |
| WO | WO 2004/114691 | 12/2004 |
| WO | WO2005/041612 | 5/2005 |
| WO | WO 2005/057968 | 6/2005 |
| WO | WO 2005/112410 | 11/2005 |
| WO | WO 2005/114918 | 12/2005 |
| WO | WO 2005/114920 | 12/2005 |
| WO | WO 2006/005999 | 1/2006 |

OTHER PUBLICATIONS

CN First Office Action dated Sep. 9, 2010, Application No. 200680036321.0 (with English translation).

European Second Examination Report dated Sep. 4, 2012, EP Application No. 06 765 138.0-2412.

Chinese Office Action dated Apr. 23, 2012, Application No. 200680036321.0.

Chinese Office Action dated Jul. 22, 2011 for CN Application No. 200680036321.0.

Chinese Office Action dated Sep. 5, 2012 for CN Application No. 200680036321.0.

International Search Report dated Nov. 8, 2006 for PCT Application No. PCT/GB2006/002820.

Written Opinion dated Nov. 8, 2006 for PCT Application No. PCT/GB2006/002820.

Japanese Office Action dated Aug. 15, 2011, JP Patent Application No. 2008-524577.

3GPP TS 23.009, Jun. 2005, vol. 6.1.0, pp. 25-39, $3^{rd}$ General Partnership Project; Technical specification Group Core Network and Terminals; Global System for Mobile Communications.

* cited by examiner

| Calls to (B-party):<br>Calls from<br>(A-party): | ZAP UE camping on the ZAP | ZAP UE camping on the PLMN | IMS-VoIP end-user | PLMN/PSTN end-user |
|---|---|---|---|---|
| ZAP UE camping on the ZAP | Signalling connected via IMS-MSC-A[1] and via IMS-MSC-B[1] Voice bearer connected via MGW-A[3] controlled by IMS-MSC-A and via MGW-B[3] controlled by IMS-MSC-B | Signalling connected via IMS-MSC-A[1] and via MSC-B Voice bearer connected via MGW-A[3] controlled by IMS-MSC-A and via MSC-B | Signalling connected via IMS-MSC-A[1] and via IMS-TAS-B Voice bearer connected via MGW-A[3] controlled by IMS-MSC-A and with B-party IP address | Signalling connected via IMS-MSC-A[2] and via CN-switch-B Voice bearer connected via MGW-A[4] controlled by IMS-MSC-A and via CN-switch-B |
| ZAP UE camping on the PLMN | Signalling connected via MSC-A and via IMS-MSC-B[1] Voice bearer connected via MSC-A and via MGW-B[3] controlled by IMS-MSC-B | Signalling connected via MSC-A and via MSC-B Voice bearer connected via MSC-A and via MSC-B | Signalling connected via MSC-A and via IMS-TAS-B Voice bearer connected via MSC-A and MGW-B controlled by IMS-TAS-B | Signalling connected via MSC-A and via CN-switch-B Voice bearer connected via MSC-A and via CN-switch-B |
| IMS-VoIP end-user | Signalling connected via IMS-TAS-A and via IMS-MSC-B[1] Voice bearer connected between A-party IP address and via MGW-B[3] controlled by IMS-MSC-B | Signalling connected via IMS-TAS-A and via MSC-B Voice bearer connected via MGW-A controlled by IMS-TAS-A and via MSC-B | N/A | N/A |
| PLMN/PSTN end-user | Signalling connected via CN-switch-A and via IMS-MSC-B[2] Voice bearer connected via CN-switch-A and via MGW-B[4] controlled by IMS-MSC-B | Signalling connected via CN-switch-A and via MSC-B Voice bearer connected via CN-switch-A and via MSC-B | N/A | N/A |

Glossary:
    CN-switch: Core Network switch, either an MSC for the PLMN or a class-5 switch for PSTN
    IMS-TAS: IMS Telephony Application Server, to provide telephony services to IMS users
Notes on signalling connectivity:
    1. This IMS-MSC connects signalling SIP to SIP
    2. This IMS-MSC connects signalling SIP to SS7
Notes on bearer connectivity (only covering the MGW controlled by IMS-MSCs):
    3. This Media Gateway connects the bearer purely on IP, with no CS operations needed and usually with no transcoding involved. Essentially it works as a router (at this stage of the call).
    4. This Media Gateway connects the bearer between IP and CS, with potentially transcoding involved.

Figure 3

HANDOVER INFORMATION SENT OVER A PUBLIC WIDE AREA NETWORK (E.G. INTERNET)

In a cellular wireless communications network, a user is able to use a communications device, such as a mobile telephone or a suitably equipped computer, throughout the coverage area of the network. This is achieved by providing base stations spaced over the coverage area. As the mobile communications device moves through the coverage area, it can establish communications with the network through different base stations. mechanisms are provided to allow the communications to be handed over from one base station to another, even while a phone call or a communications session is in progress.

It has been proposed to provide a base station that does not have a dedicated connection in to the core network of the mobile network operator, but instead connects to the core network over an existing public wide area network. For example, the base station can be located at the premises of a customer, for example a private customer or a small business, and can use that customer's existing broadband internet connection to establish communications with the core network of the mobile network operator.

However, it still remains advantageous for the customer to be able to handover communications between that base station and other network nodes of the cellular wireless communications network.

According to a first aspect of the invention, there is provided mobile communications network, comprising:
 a PLMN, comprising a plurality of network nodes;
 a core network anchor node; and
 an access point, serving as a basestation in the mobile communications network, and being able to establish a tunneling connection over a public wide area network to the core network anchor node, such that, in the event of a handover between the access point and another of the network nodes of the PLMN, handover information is sent between the access point and the other of the network nodes of the PLMN over the public wide area network.

According to a second aspect of the invention, there is provided a method of achieving a handover in mobile communications network, wherein the mobile communications network comprises a PLMN, having a plurality of network nodes, a core network anchor node, and an access point, serving as a basestation in the mobile communications network, wherein the basestation is connected over a public wide area network to the core network anchor node, the method comprising, in the event of a handover between the access point and another of the network nodes of the PLMN, sending handover information between the access point and the core network anchor node over the public wide area network.

For a better understanding of the present invention, and to show how it may be put into effect, reference will now be made, by way of example, to the accompanying drawings, in which:—

FIG. 3 is a table, illustrating how possible calls are handled in the network in accordance with the present invention.

Figure 9:
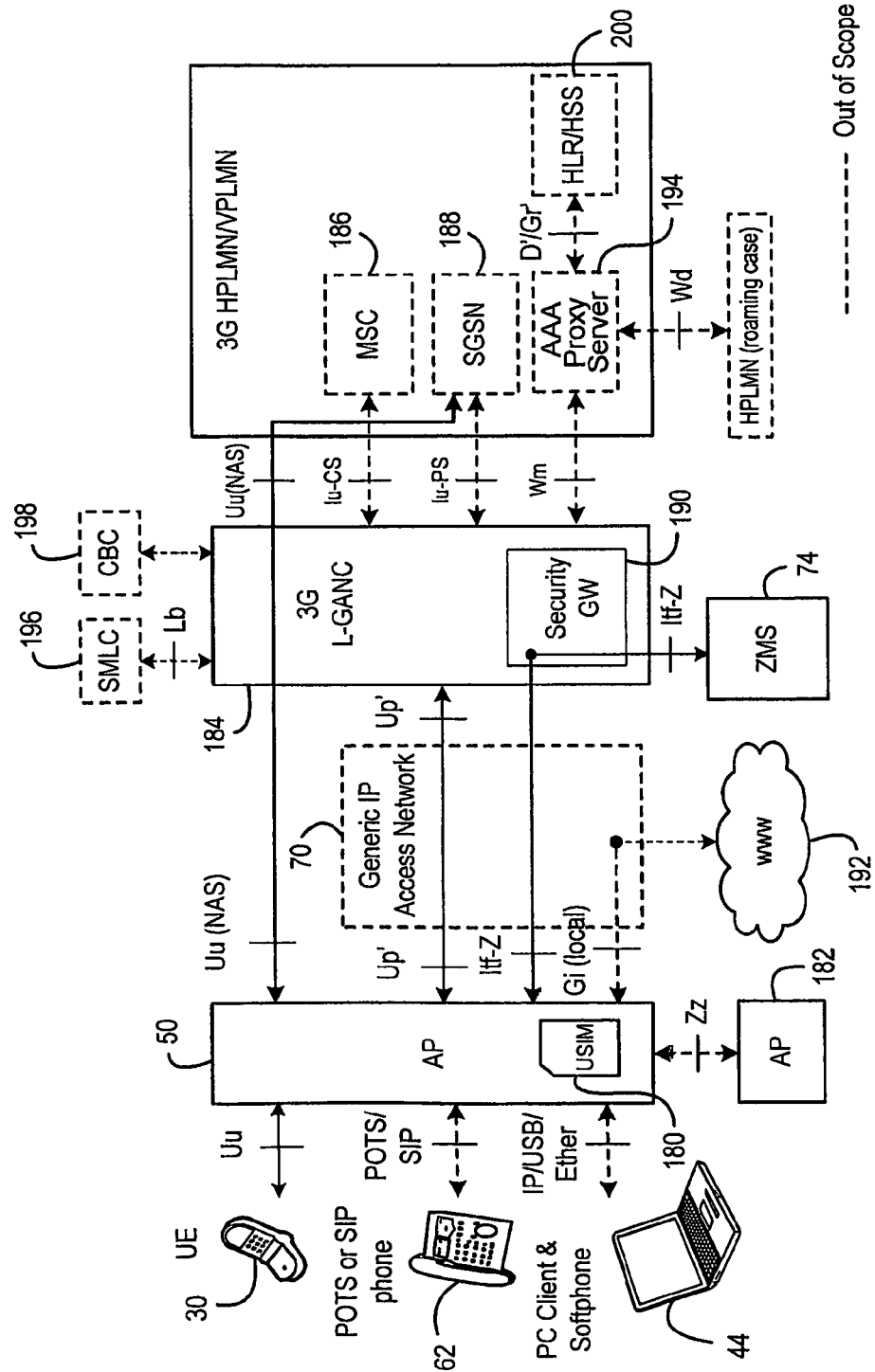
FIG. 9 is a block schematic diagram, showing a communications network in accordance with the present invention.
Figure 11:
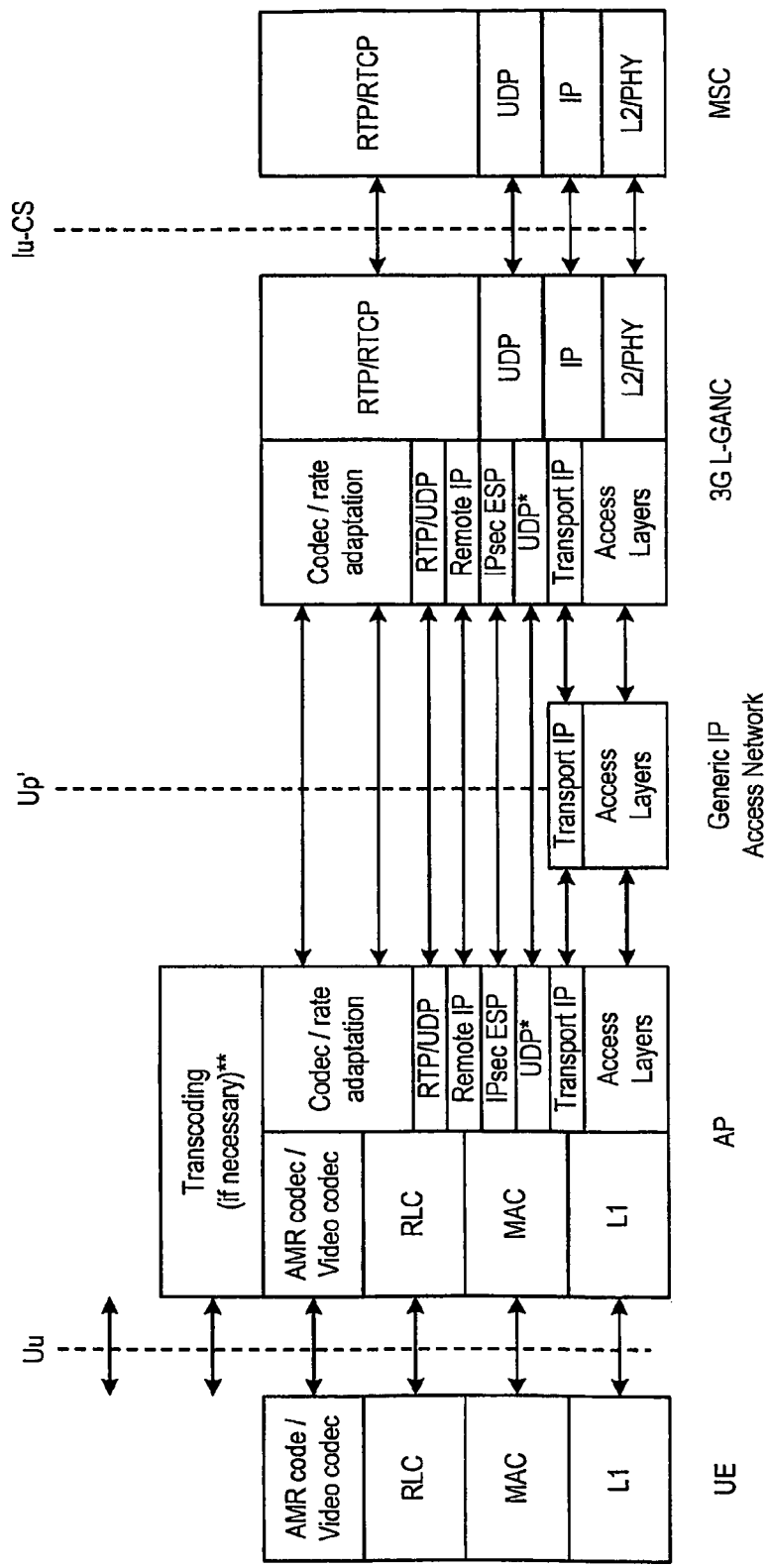

FIG. 11 further illustrates the communications between components of the network of FIG. 9.

Figure 12:
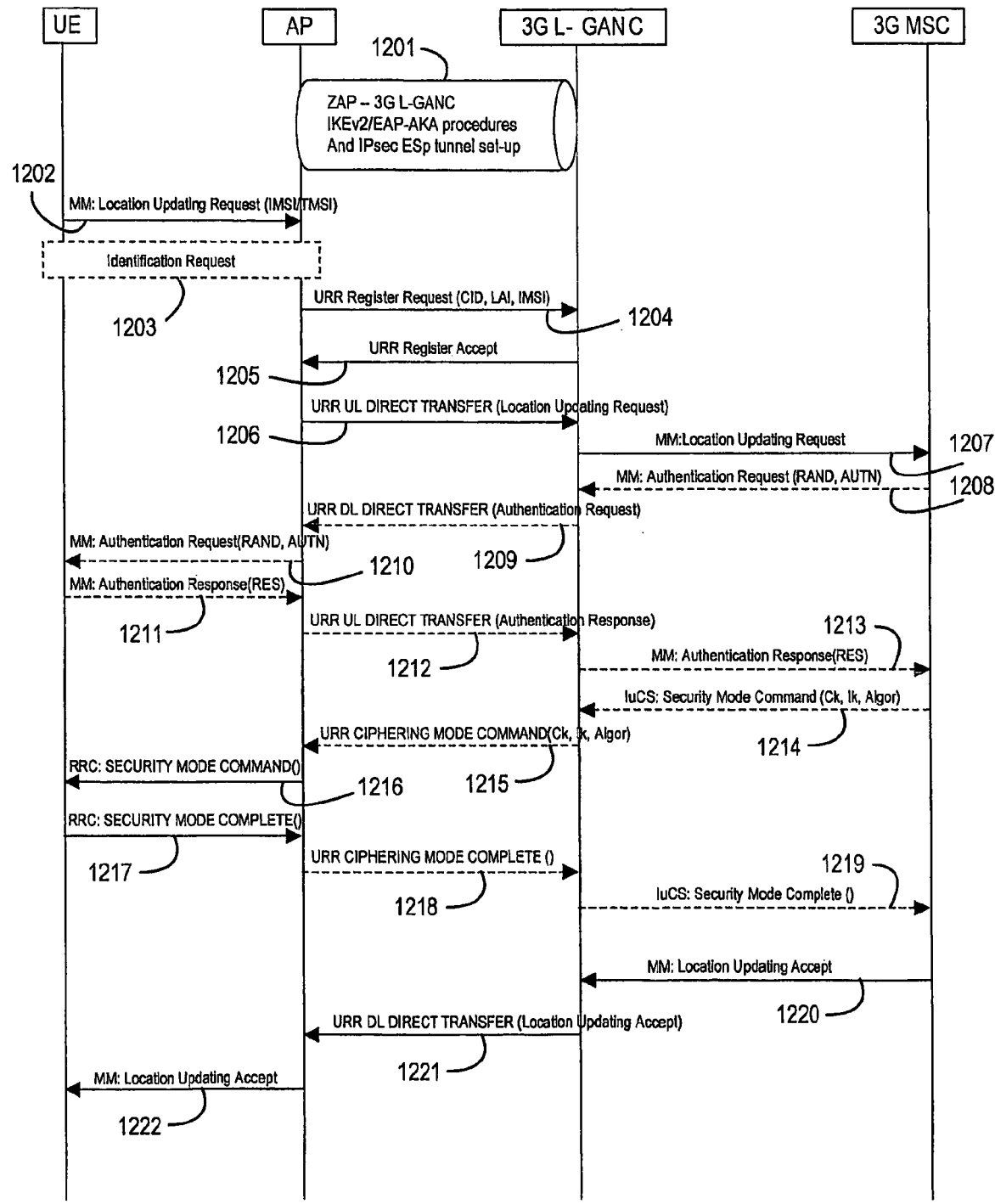

FIG. 12 illustrates a procedure in accordance with an aspect of the present invention.

Figure 13:
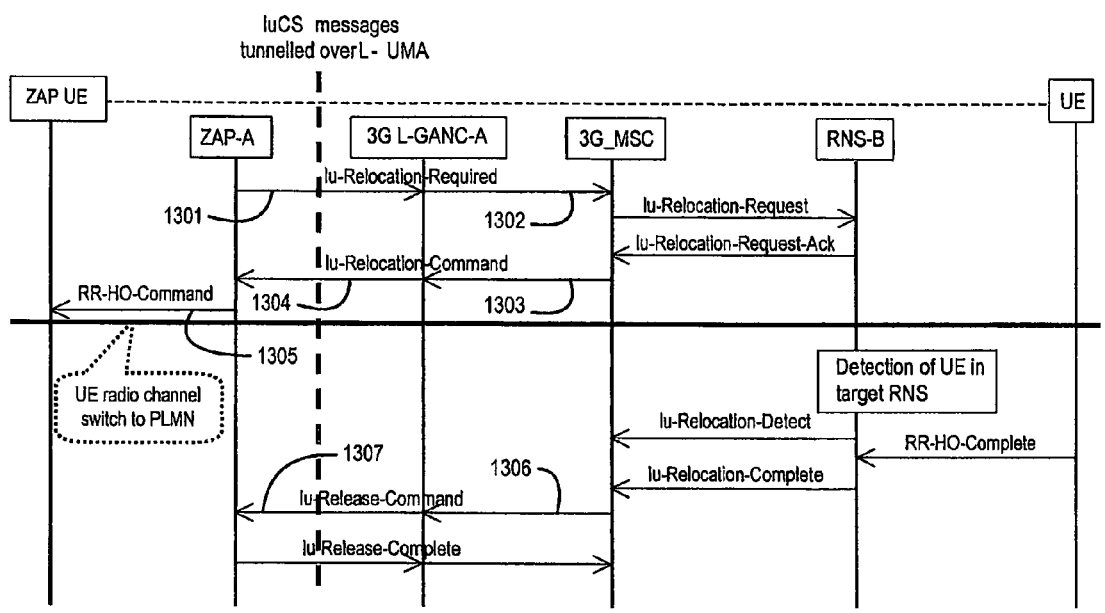

FIG. 13 illustrates a handover procedure in accordance with an aspect of the present invention.

Figure 14:
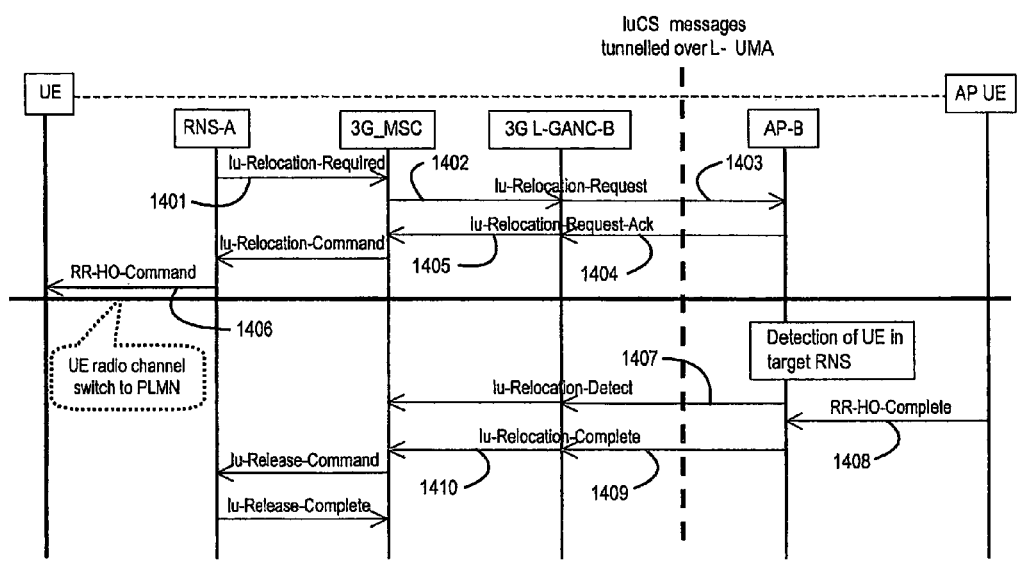

FIG. 14 illustrates a further handover procedure in accordance with an aspect of the present invention.

Figure 15:
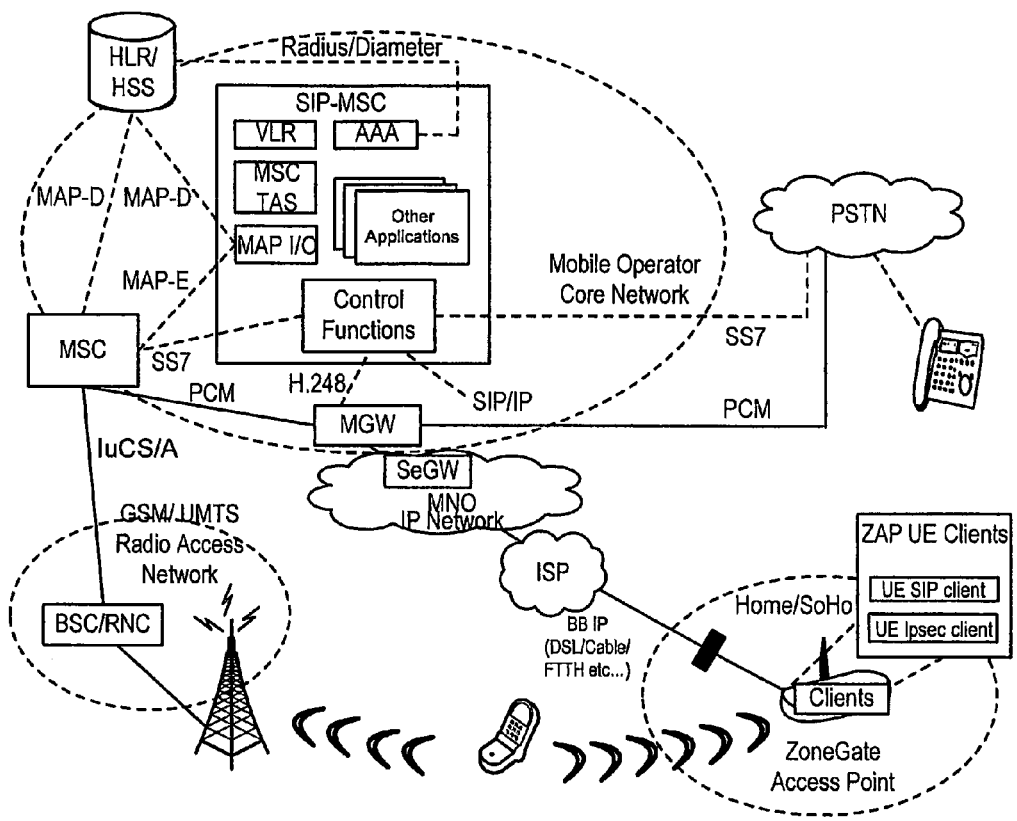

FIG. 15 is a further block diagram, illustrating in more detail aspects of the network in accordance with an embodiment of the present invention.

Figure 1:
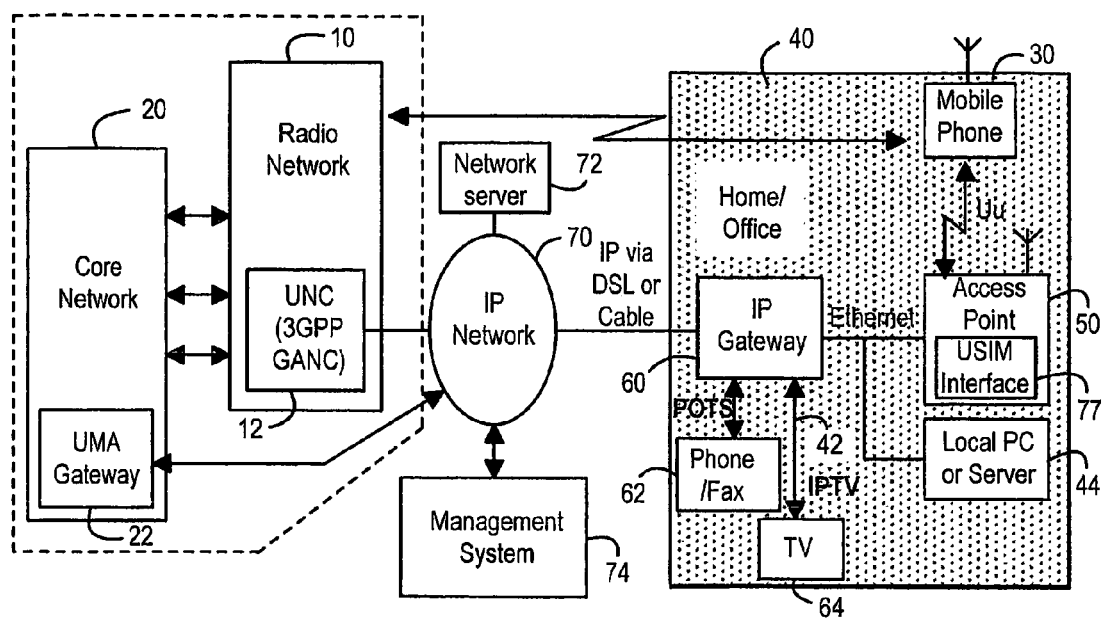
FIG. 1 is a block schematic diagram, showing a communications network in accordance with the present invention.

FIG. 1 is a block schematic diagram, illustrating a system architecture. A mobile network operator (MNO) owns and operates a wireless communications network, including a radio network 10, including a network of cellular basestations (not shown), and a core network 20, having a connection into the fixed telephone network. These are generally conventional, except as described below.

A mobile phone 30, when roaming in the territory covered by the wireless communications network, is able to establish a wireless connection with one of the cellular basestations, in order to communicate with other telephones in the fixed telephone network, or with other mobile phones, which have established their own wireless connections with a cellular basestation, and hence with the fixed telephone network.

In accordance with the present invention, there is provided, for example within a home or office 40 or in another location where additional wireless coverage is required, a further basestation, or access point, 50. This access point 50 is provided for use by the owner of the premises where it is located, but is integrated into the wireless communications network. That is, the access point shares the part of the radio frequency spectrum allocated to that wireless communications network, by having allocated to it, either permanently or temporarily, some of the group of channels. This group of channels is thus shared with other basestations, which may serve macrocells, microcells, picocells, or even "femtocells", in the public, wide area network. As a result, the mobile phone 30 can roam from the access point 50 to another basestation when leaving the immediate vicinity of the access point 50, or can roam to the access point 50 from another basestation when returning to the immediate vicinity of the access point 50.

The access point 50 therefore acts as a basestation within the relevant wireless communications network. For example, it can allow an entirely conventional and unmodified mobile phone 30 or other user device to establish a connection for voice and/or data services using GSM/GPRS and/or UMTS air interfaces. Of course, the access point 50 can be enabled to establish connections with the mobile phone 30 using the standard air interface of any suitable cellular wireless communications system.

The access point 50 has a connection for an Ethernet Local Area Network (LAN) 42, within the home or office 40. As shown in FIG. 1, the access point 50 can connect over the Ethernet LAN 42 to one or more local PCs or servers 44.

The access point 50 can connect over the Ethernet LAN 42 to an IP gateway device 60. The IP gateway device 60 provides an IP connection over an IP network 70, for example the internet, to the MNO network either via a Digital Subscriber Line (DSL) or via other IP transport methods such as a digital multimedia Cable network. Thus, the existing IP connection from the home or office can be used to provide backhaul from the access point 50. Flexible interfacing to the operator's core network 20 can be provided via connections to either the MNO Core Network or Radio Access Network, using the UMA standard through a UMA gateway 22. This approach enables low-cost transport of data and voice using Voice-over-Internet Protocol (VoIP) techniques.

The connection from the IP gateway 60 over the IP network 70 into the MNO Radio Access Network 10 is provided by a UMA Unlicensed Network Controller (UNC) 12, which has been standardised by 3GPP as a Generic Access Network Controller (GANC).

Other non-standardised solutions to interface to the Radio Access Network 10 could also be employed as an alternative approach, as will be described in more detail below. Direct connection to the operator's Core Network can be achieved through use of a SIP interface between the access point and a suitable gateway such as a SIP Gateway or an IP Multimedia Subsystem.

In this illustrated embodiment, the DSL or cable IP gateway device 60 includes provision for connection of a POTS telephone or fax device 62, and audio/video connections for providing IPTV services to a TV 64. The access point 50 includes a services environment which allows these facilities to be integrated into the MNO network, enabling sophisticated new services for users.

In an alternative implementation of the invention, the access point 50 can be integrated as a component within the IP gateway device 60; an internal IP connection then links the embedded access point component to the router functions within the IP gateway device. This configuration can potentially provide a lower overall cost and is convenient for operators looking to provide gateway units which unify data, fixed voice, multimedia and mobile services.

Thus, while the mobile phone 30 is within the home or office 40, or otherwise within the coverage area of the access point 50, it can connect into the MNO network in the same way as via any other basestation in the cellular wireless communications network.

FIG. 1 also shows a network server 72 connected to the IP network 70. As will be appreciated, where the IP network 70 is the internet, a very large number of servers and other devices are connected to the network. As will be described in more detail below, the user of the mobile phone 30 can access such devices by means of the access point 50.

FIG. 1 also shows a management system 74, connected to the IP network 70. The management system 74 is provided by the mobile network operator for managing the operation of the access point 50, including controlling the available services.

For example, as mentioned above, and as described in more detail below, a user of the mobile phone 30 can establish a connection through the access point 50 over the Ethernet LAN 42 to one or more local PCs or servers 44, or through the IP gateway device 60 to another device connected thereto, or through the IP gateway device 60 to a network server 72 connected to the IP network 70. These connections can be established without passing traffic over the core network 20 of the wireless communications network. The management system 74 is able to define the devices, or the IP addresses, with which such connections can be established. Then, these connections can be established with only a restricted number of devices or IP addresses, if desired by the mobile network operator.

Also, the management system 74 is able to specify the channels (which may be defined by frequencies, time slots, and/or spreading codes, depending on the particular cellular wireless communications system) allocated to the access point 50. These channels may be allocated semi-permanently, or may be changed regularly, depending on the requirements of the network as a whole.

The invention is described herein with reference to the case where the mobile network is a UMTS network, although it will be appreciated that many of the details apply also where the mobile network is, for example, a GPRS network.

As shown in FIG. 1, the access point 50 preferably also includes a USIM interface 77. This allows a conventional SIM card to be inserted into the access point 50, and then allows the access point 50 to identify itself to the network.

In one aspect of the present invention, there is provided a method for allowing a user equipment (UE), such as the mobile phone 30 or any other suitable mobile communications device to handover between the access point 50 and another network node of the mobile network. This can then be a same-technology handover, which does not trigger a new call setup.

UMTS handovers can involve different core network elements depending on the topology of the network and the connectivity of the neighbour cells.

Handover can be supported either by the use of SIP, or LGAN, and these will be discussed in more detail below.

However, the handover trigger decision and the UE cell reselection procedure are applicable in all of the handover procedures described here.

The cell reselection procedure is analysed first, as the core of the measurements are the same for the handover decision. Specifically, while in idle mode, the UE is doing cell searches at all times using quality information from broadcast channel. When the quality criterion is met it will move to the new cell. The general procedures are defined in 3GPP TS 25.304, User Equipment (UE) procedures in idle mode and procedures for cell reselection in connected mode.

In more detail, 3GPP TS 25.304 states that:

"The UE shall scan all RF channels in the UTRA bands according to its capabilities to find available PLMNs. On each carrier, the UE shall search for the strongest cell and read its system information, in order to find out which PLMN the cell belongs to. If the UE can read the PLMN identity, the found PLMN shall be reported to the NAS as a high quality PLMN (but without the RSCP value), provided that the following high quality criterion is fulfilled:

"1. For an FDD cell, the measured primary CPICH RSCP value shall be greater than or equal to −95 dBm.

"2. For a TDD cell, the measured P-CCPCH RSCP shall be greater than or equal to −84 dBm."

This means that the UE will only search for one PLMN per frequency as it only reads the SIBs of the strongest cell. This does prohibit the possibility of having 2 PLMNs on the same frequency if they overlap—the Macro cell could be the strongest. So, if same carrier is used for the access point 50, then the PLMN ID broadcast by the access point 50 shall be same as the public one.

For all procedures, the cells served by the access point 50 and other similar access points are on a separate location area. Potentially multiple location areas can be reserved to the users of those access points. This means that each access point to PLMN or PLMN to access point cell reselection is followed by a location registration procedure (LAU or combined GPRS attach or GPRS attach).

In the case of PLMN to access point cell reselection, the PLMN cell does not broadcast the access point cell IDs under its coverage. Note that up to a few tens of access points could be sitting under the same PLMN cell coverage area. So the UE follows the procedure described above to discover the access point cell signal power. When the cell reselection triggering conditions are reached, the UE sets-up the RRC layer with the access point.

The access point can enforce the user screening at this stage by rejecting the RRC requests containing TMSI and forcing the UE to send the IMSI instead. This solution has the advantage to send back immediately to public coverage the UE that are not allowed to camp on the access point. Optionally, for already known and unauthorised TMSIs, e.g. the one of a not allowed UE that has already tried to access the access point recently, the access point can reject the RRC request forcing the UE to go back to macro coverage immediately.

Optionally, the access point can accept the RRC request with a TMSI, wait for the UE to send the location registration request containing the same TMSI and then send an MM:Identity_Request to obtain the IMSI before proceeding with the core network registration. This slows down the return to public coverage for not allowed UEs.

In the case of access point to PLMN cell reselection, if public coverage is measurable by the access point, then the access point broadcasts the known good neighbour cells list in the broadcast channel, to speed up the UE cell reselection. Note that, in most cases, only one neighbour cell is enough to cover all cell re-selection cases as the access point coverage area is very small in comparison with a PLMN cell coverage area. The access point also adds the known good neighbour cells list in the RRC release message to the UE.

If the same PLMN coverage is absent in the access point surrounding, then the access point can optionally send the list of known good cells from other PLMNs as defined by an internal rule (note that the management system 74 should download a list of possible PLMNs).

When the cell reselection triggering conditions are reached, the UE selects the PLMN cell by using the information sent by the access point or the internal information captured about the last known good cell it camped on. Note that the latter case may not be valid if the UE was powered off before moving into the home area.

Once the UE has selected the PLMN cell, it sets-up the RRC layer with it, immediately followed by a location registration. At the end of the location registration procedure with the core network, the access point receives a SIP:NOTIFY message from the core network to deregister the UE.

If the UE loses access point coverage, i.e. due to a access point power off, the mobile will search for cells using historical data from previous cells camped on to and, if none of them has good signal, it will perform the initial cell search method—this is a search of the entire frequency range.

In the case of cell reselection to a different PLMN, if the RF planning has not reserved a carrier for the access point deployments, then the PLMN ID broadcast by the access point must be the same as the public network PLMN ID. If the RF planning has reserved a carrier for the access point deployments, then the PLMN ID broadcast by the access point can be the same as the public network PLMN ID, or it can be different.

The handover trigger decisions will now be considered. The precondition for all of the handover cases here described is that the UE is in connected mode.

In the case of an access point to PLMN handover, during the call, the UE monitors the access point signal multiple times per second. The access point sends to the UE the threshold of signal level. The UE keeps a normal connection with the access point until after the signal has gone under the threshold determined in this way in order to minimise the probability of repeated handovers back and forth with the macro network. Note that this threshold must be set to a level that corresponds to slightly perceivable voice quality deterioration. Additionally, the access point sets a suitable high hysteresis level so that the UE triggers the handover procedure only when the access point signal is under the handover threshold and the PLMN neighbour cell signal is higher than the access point signal by more than the hysteresis level.

The hysteresis level must be chosen so that handover is only triggered if the PLMN signal is significantly better than the access point signal.

In the case of a PLMN to access point handover, the UE could decide to start the handover when the access point signal is over the signal threshold as defined above plus the hysteresis, independently from whether the PLMN signal is still strong or not.

Considering now the case where the handover is supported by the use of SIP, the discussion herein relates to the case of an Inter-MSC handover (Iu-based). In this case, the MSC of the access point 50 needs to communicate with the core network MSC to exchange the handover information on the inter-MSC Iu Interface. Calls remain anchored at the originating MSC until their disconnection, potentially with subsequent handovers to other MSCs.

It is possible to use the procedures defined for this type of handover to implement a core network IMS-based MSC for the peering with PLMN MSCs. This solution is analysed below. An equivalent alternative to the IMS-based MSC solution presented here is to implement a core network IETF SIP-based MSC using IETF SIP standard interfaces to the access point and analogous in all of the other functions to the IMS-based MSC.

There are at least two possible solutions.

Firstly, an inter-MSC/IMS handover can be considered. That is, the Inter-MSC Iu-based model can be extended to the IMS. In this case the IMS has a function that behaves like an MSC to the PLMN MSCs and provides the anchoring point for the call in the SIP domain.

Secondly, a call control function in the access point 50 can be used to keep alive the existing call (for example by playing music or a transfer message) and set-up a new call to the UE via the PLMN when the UE moves to the PLMN coverage. This could be complemented by a USIM application in order to have an automatic answer to this new call. This solution works only when handing over from the access point 50 to the PLMN.

The case of the Inter-MSC/IMS handover will now be described in more detail.

Figure 2:
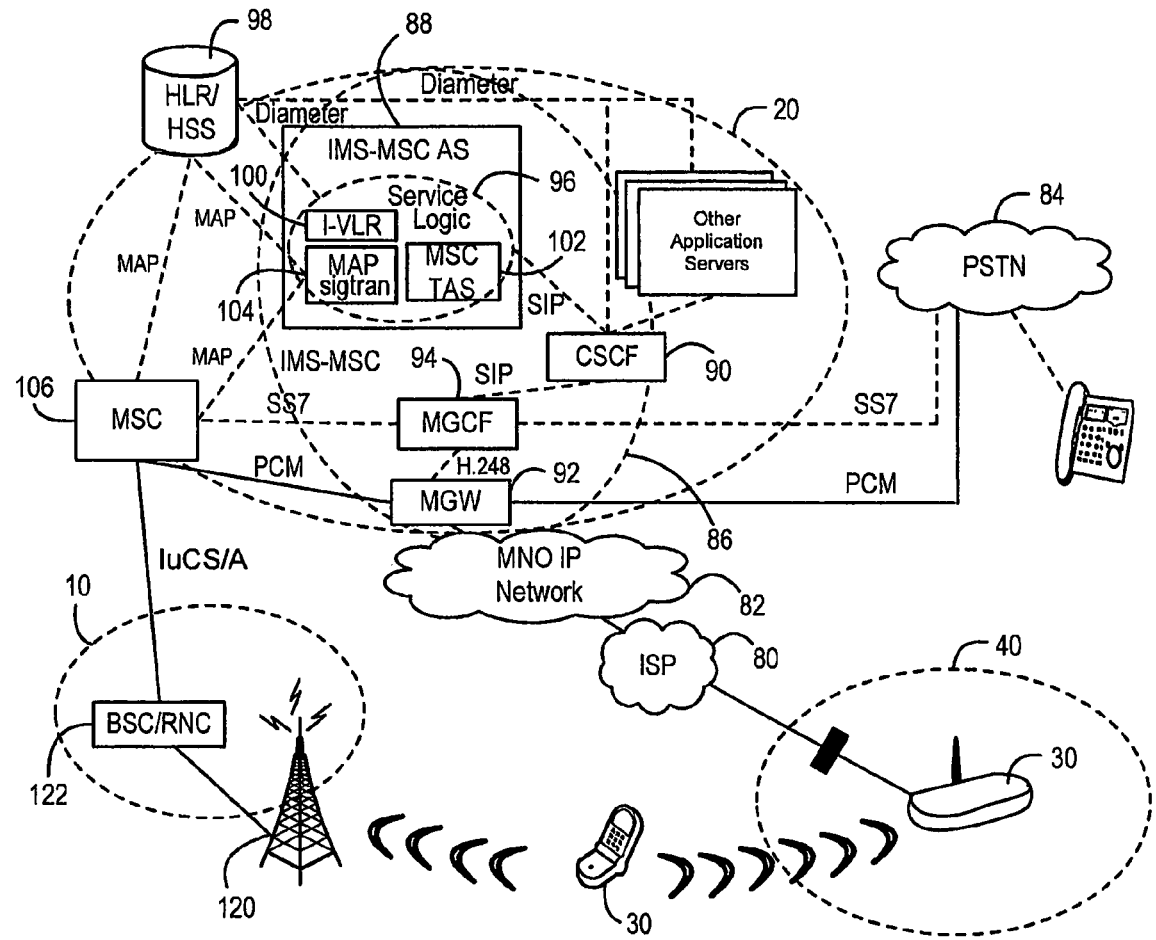
FIG. 2 is a further block diagram, illustrating in more detail aspects of the network in accordance with the present invention.

The IMS-MSC architecture is based on the IMS standards architecture with a dedicated application server. The IMS-MSC main functions are identified in the following with the intent of describing the general functionality and to suggest possible reuse of existing IMS functions and network elements. The IMS-MSC solution described here is also applicable to the pre-IMS SIP solution (IETF SIP), where a SIP-MSC takes care of the described functions of the IMS-MSC. The general IMS-MSC architecture, including its connectivity with the mobile operator's core network, is shown in FIG. 2. The general SIP-MSC architecture, including its connectivity with the mobile operator's core network, is shown in FIG. 15. The SIP-MSC functions are mapped one to one with the IMS-MSC ones and perform analogous functions. Only the IMS-MSC will be explained in detail in the following.

As shown in FIG. 2, an access point 50 is located in a customer's home or office 40, although it will be appreciated that it can be positioned in any convenient location. The access point 50 is connected to the core network 20 of a mobile operator by means of a public wide area network which, in this case, comprises the customer's internet service provider's broadband internet connection 80 (for example, DSL, cable, etc) and the mobile network operator's IP network 82.

The core network 20 has connections to the mobile network operator's radio access network 10, and to the PSTN 84. A mobile phone 30, or other UE, can establish wireless connection with either the radio access network 10 or the access point 50.

The IMS-MSC 86 includes an IMS-MSC application server 88, plus other functions defined in the 3GPP standards. Specifically, in order to provide the required functionality, the IMS-MSC 86 also includes a Call Session Control Function (CSCF) 90, as described in 3GPP TS 23.228, "IP Multimedia Subsystem; Stage 2", in order to support the SIP signalling control for the end-user. It can take the form of a Proxy CSCF, an interrogating CSCF, or a Serving CSCF. The IMS-MSC 86 also includes a Media Gateway (MGW) 92, for supporting the bearer connectivity, circuit switched to IP adaptation and media transcoding. The IMS-MSC 86 also includes a Media Gateway Controller Function (MGCF) 94, again as described in 3GPP TS 23.228, "IP Multimedia Subsystem; Stage 2", for performing the control of the MGW and the signalling translation SIP/SS7.

These elements are shared with other IMS applications, if any. Other IMS functions, like MRFP, MRFC, SCIM, BGCF, GMLC, IM-SSF, etc. . . . , can be integrated with the IMS-MSC to provide full IMS services, if desired.

The IMS-MSC Application Server 88 includes IMS-MSC Service logic 96. This function supports the overall IMS-MSC service logic, complementing the functions identified in the following and allowing the internal communication between them. It supports the network management of the unit and the generation of Call Detail Records (CDRs). It supports the SIP interface between the IMS-MSC 86 and the CSCF 90 and the Diameter Sh interface between the IMS-MSC 86 and the HSS 98.

The IMS-MSC Application Server 88 also includes an i-VLR function 100. This function simulates a UMTS MSC VLR for the UEs camped onto the access point 50 or other access points. It connects via an MAP-D interface to the HSS/HLR for the exchange of user information and it has a VLR number associated in the HSS/HLR. It also connects via the MAP-E interface to the PLMN MSC VLR for the exchange of handover messages.

The IMS-MSC Application Server 88 also includes a MSC Telephony Application Server (TAS) function 102, containing the call control service logic for simulating a UMTS MSC. It acts as the GMSC for the UEs camped onto the access point 50 or other access points.

The IMS-MSC Application Server 88 also includes a MAP Sigtran 104. This is the interworking function between the IMS-MSC functions and the MAP interfaces with the GSM/UMTS MSC 106, and other MSCs in the PLMN, and with the HSS/HLR 98.

The IMS-MSC architecture can be chosen to co-locate all the above functions in the same machine or distribute them. The distributed architecture is recommended for the case where the MAP Sigtran function 104 and the MSC TAS function 102 are shared with other systems, e.g. with a 3GPP Release 4 3G MSC (split architecture MSC).

Each camped on UE is authenticated with the CSCF 90 by the access point, which instantiates a UE-specific SIP client for communication with the IMS core network and communicates on standard Uu interface with the UE. Then, at the end of the successful authentication of the UE with the CSCF, the S-CSCF 90 forwards the SIP:REGISTER message to the IMS-MSC AS 88 on the ISC interface. This message contains the UE IMSI.

At the reception of the SIP:REGISTER message, the IMS-MSC AS 88 starts a location update procedure with the HSS/HLR 98 on the MAP-D interface to inform the HSS/HLR 98 of the VLR number now serving the UE and to obtain the VLR subscriber information to store in the I-VLR 100. Any authentication vectors received from the HLR/HSS 98 are discarded.

Optionally, the IMS-MSC AS 88 can request a copy of the UE ciphering material being used by the access point 50. Such a request is encapsulated over a SIP:MESSAGE to the access point, as is the answer. This is optional as the IMS-MSC uses the ciphering information only during the handover procedure with another PLMN MSC and the ciphering material is preferably sent by the access point during that procedure.

At the successful completion of the registration procedure, the access point UE circuit switched information is stored in the IMS-MSC I-VLR 100, optionally including the encryption keys (Ik, Ck) currently used for the radio interface in the access point 50, and the Mobile Roaming Number (MRN) pointing to the Media Gateway 92 controlled by the IMS-MSC 86.

All the calls initiated while the UE is camping on the access point 50 are connected via the IMS-MSC 86 to enable the handover functionality. Calls originated by UEs associated with the access point 50 but camping on the PLMN are connected with the PLMN core network as usual.

For each call, the possible combinations of A and B parties include the cases where:

the A or B party is an access point UE camping on the access point 50;

the A or B party is an access point UE camping on the PLMN;

the A or B party is an IMS-VoIP end-user (or, similarly, for IMS-based services, where the A or B party is an IMS application server);

the A or B party is a PLMN/PSTN end-user (this applies also for PLMN supplementary services and other services where the A or B party is a PLMN switch or standalone application server).

FIG. 3 takes the form of a table, showing the general rules for the initial UE call connectivity, before any handover, in the cases where the A and B parties are any of the types of device mentioned above.

Figure 4:
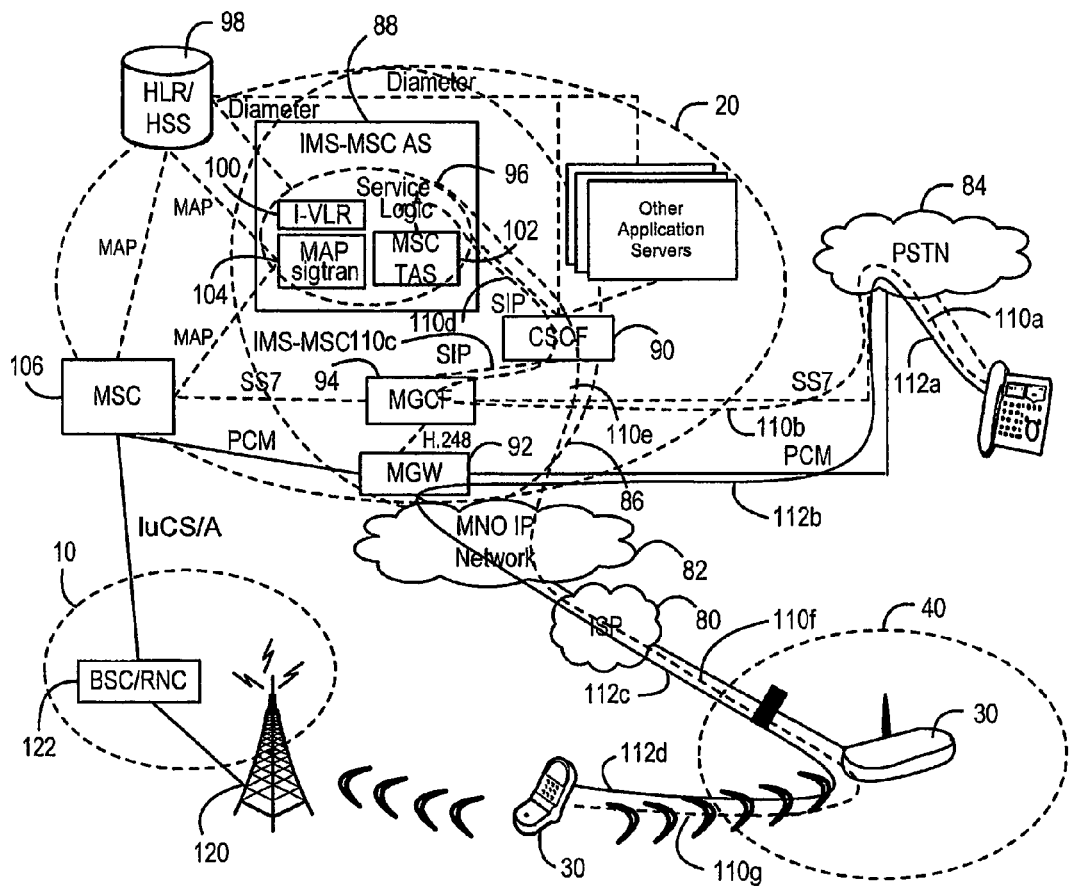
FIG. 4 is a further block diagram, illustrating in more detail aspects of the network in accordance with the present invention.

FIG. 4 is then provided, as an example, showing the connectivity of a voice call originated by a PSTN end-user (the A-party) and terminated by a UE camping on the access point (the B-party). The signalling connectivity is shown with a dotted line made up of the sections 110a-110g, while the bearer connectivity is shown with a solid line made up of the sections 112a-112d.

The case of a handover from the access point 50 to the PLMN will now be described in detail. When the UE registers in the access point 50, the IMS-MSC 86 is involved in the registration procedure in order to store the subscriber information in the I-VLR 100 as described above. Voice calls initiated while the end-user is camping on the access point 50 are generally connected via the IMS-MSC 86, although it is also possible to make calls directly from one access point-enabled UE to another access point-enabled UE or VoIP user without involving core network support.

When the UE starts the handover procedure to the PLMN, this is seen by the UE as a normal handover. The procedure followed in the core network is generally the same as in a conventional inter-MSC handover, as described in 3GPP TS 23.009, "Handover procedures" and 3GPP TS 29.010, "information element mapping between Mobile Station—Base Station System (MS-BSS) and Base Station System—Mobile-services Switching Centre (BSS-MSC); Signalling procedures and the Mobile Application Part (MAP)", where the IMS-MSC 86 serving the UE is the anchor MSC.

Figure 5:
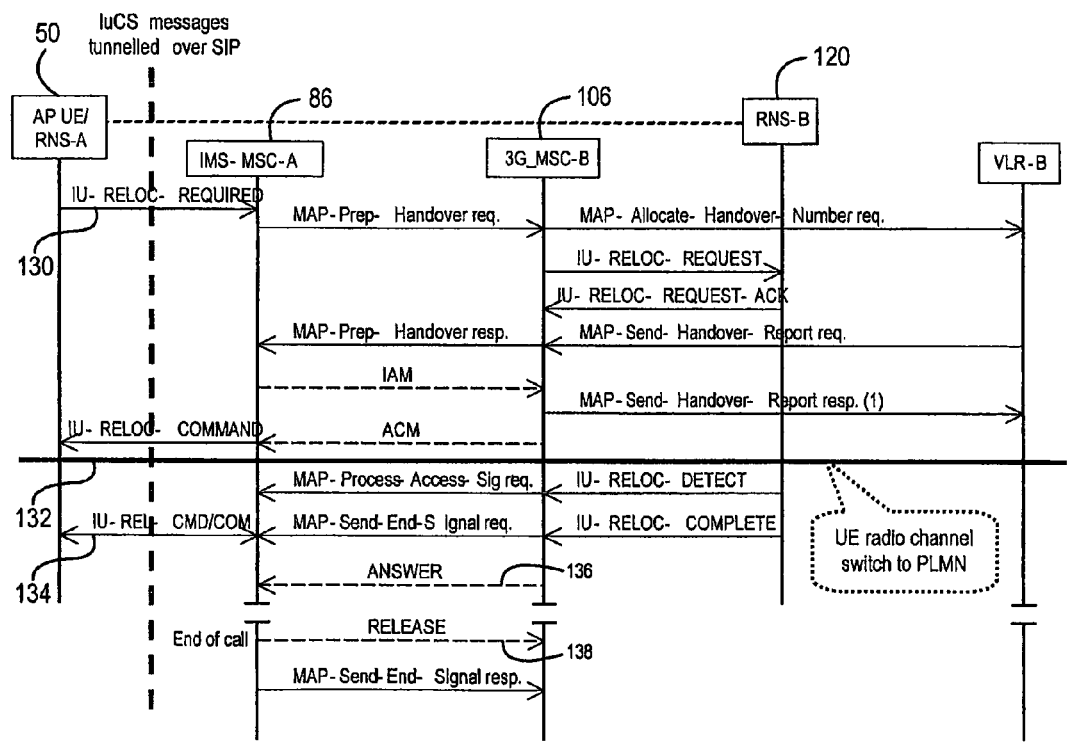
FIG. 5 illustrates a handover procedure in accordance with an aspect of the present invention.

The UMTS signalling procedure on the IuCS and MAP-E interfaces is shown in FIG. 5. Specifically, with reference to FIG. 2, illustrating the UE 30 handing over from the access point 50 to the base station 120 controlled by the RNC 122, FIG. 5 shows the messages exchanged between the access point 50 (the AP UE/RNS-A), the IMS-MSC-A 86, the 3G MSC-B 106 and the RNS-B 120.

Figure 6:
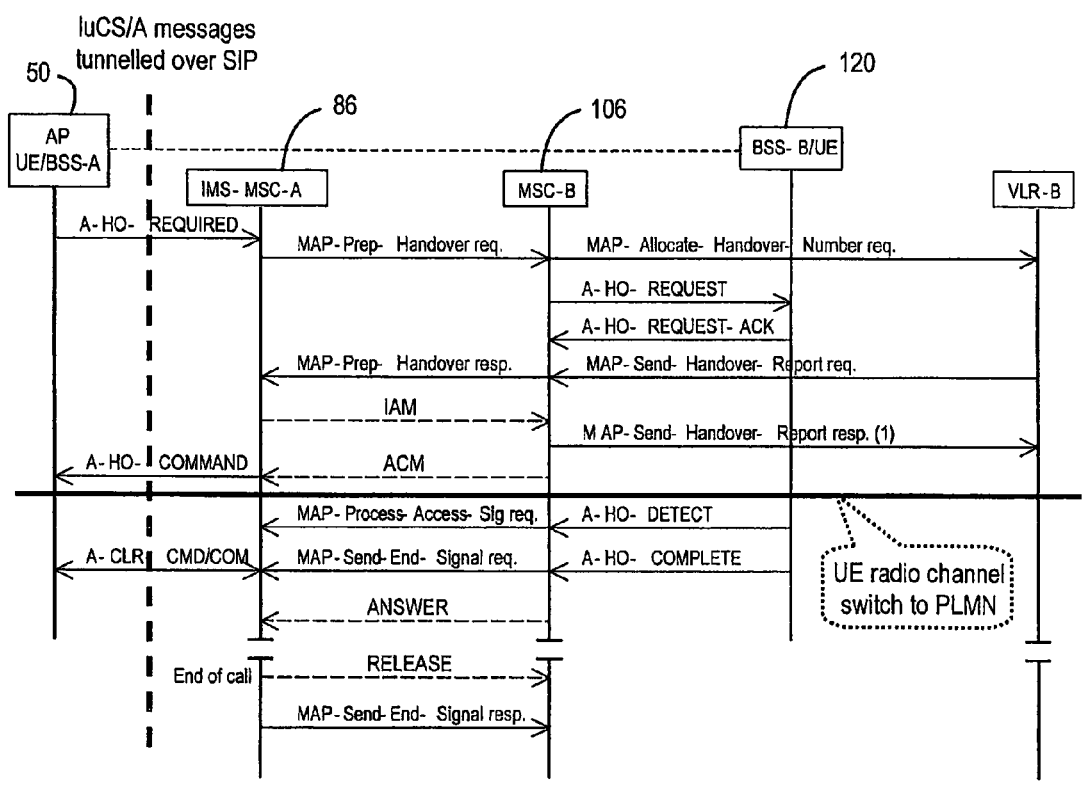
FIG. 6 illustrates a further handover procedure in accordance with an aspect of the present invention.

The GSM signalling procedure is shown in FIG. 6. Specifically, with reference to FIG. 2, illustrating the UE 30 handing over from the access point 50 to the base station 120 controlled by the BSS 122, FIG. 6 shows the messages exchanged between the access point 50 (the AP UE/BSS-A), the IMS-MSC-A 86, the MSC-B 106 and the BSS-B/UE 120.

The UMTS signalling procedure as shown in FIG. 5 is now described. As mentioned above, the handover procedure is generally similar to a conventional Inter-MSC handover procedure as described in the 3GPP specifications, and only the changes are described fully below. The GSM procedure, as shown in FIG. 6, is equivalent, and will not be described in detail.

The exchange of IuCS handover messages between the access point 50 and the IMS-MSC 86 is tunnelled over SIP. Each message is encapsulated into a SIP:MESSAGE as the payload. The access point 50 also supports a local MSC for local calls treatment. However, when the handover conditions are met, the access point 50 internal RNC handover messages are not sent to the local MSC, but to the IMS-MSC 86 using this SIP tunnelling.

The procedure begins when the access point (AP) sends the IU-RELOC-REQUIRED message 130 to the IMS-MSC serving the UE encapsulated in a SIP:MESSAGE message. This message includes the ciphering material information (Ik, Ck and applied algorithm), which the IMS-MSC will use for the continuation of the procedure according to the standards.

At the reception of the IU-RELOC-COMMAND 132, encapsulated in a SIP:MESSAGE, the access point sends the relocation command to the UE. The UE will then relocate to the PLMN cell by establishing the RRC connection there.

At the reception of the IU-REL-CMD/COM message 134, the access point clears the voice bearer with the end user, clears the UE related IPsec tunnels to the core network elements, and de-instantiates the UE SIP client.

The MSC-B should preferentially set-up the new circuit connection as transcoder free operation as defined in 3GPP TS 23.153, "Technical Specification Group Core Network and Terminals; Out of band transcoder control; Stage 2", to avoid changes at the current MGW transcoding (MGW controlled by the IMS-MSC).

After the ANSWER message 136, the IMS-MSC is the anchor point for the call now served in MSC-B.

At the call release 138, the UE triggers a location registration procedure in the PLMN to complete its relocation, which ultimately clears the user context in the IMS-MSC. From this moment on the UE is served inside the PLMN with no IMS-MSC involvement.

Optionally, the IMS-MSC can keep the access point UE subscriber data as a deactivated entry, in order to speed up any subsequent access point UE relocation in the coverage area of the access point.

The access point does not support the trace commands and, if received, it is ignored by the IMS-MSC.

The bearer switching will now be considered. Before the handover, the call bearer to the UE is connected via the MGW 92 controlled by the IMS-MSC 86. The UE is circuit-switched connected via UMTS radio to the access point 50. The access point 50 converts CS voice frames from/into VoIP frames without transcoding (AMR frames encapsulated over RTP/IP). The access point 50 connects to the MGW 92 via RTP/IP using the existing IPsec tunnels with the PDG.

The MGW connectivity to the other party depends on the type of other party involved in the call. If the other party in the call is a PSTN/PLMN end-user, then the MGW 92 connects the bearer to a CS PCM interface. If the other party in the call is an IMS end-user or another UE camping on an access point 50, then the MGW 92 connects the bearer via RTP/IP.

During the handover procedure, a new CS bearer is set-up on the PLMN and between the target MSC 106 and the IMS-MSC-controlled MGW 92. When this bearer is ready, the IMS-MSC 86 commands the MGW 92 to switch to the new CS bearer and release the previous RTP/IP one to the access point 50.

After the handover, the MGW connectivity to the other party remains the same as before the handover, and the MGW connects via PCM to the UE now camping on the PLMN. The new bearer with the PLMN is preferentially a transcoder free operation as defined in 3GPP TS 23.153, "Technical Specification Group Core Network and Terminals; Out of band transcoder control; Stage 2". In this way, at the handover the MGW 92 does not need to change the current transcoding operation. If transcoder free operation is not supported in the PLMN, then the MGW 92 has to change the current transcoding accordingly.

The case of a handover from the PLMN to the access point 50 will now be described in detail. Voice calls initiated while the end-user is camping on the PLMN are connected via the PLMN MSC 106 to the other call party. The PLMN MSC 106 also stores the UE subscriber information in the local VLR.

The access point 50 has already registered with the core networks, and in doing that it has set up the IPsec security with the PDG as well as the binding with the P-CSCF for relevant SIP messages.

When the UE starts the handover procedure to the access point 50, this is seen by the UE as a normal handover. The procedure followed in the core network is generally the same as in a conventional inter-MSC handover, as described in 3GPP TS 23.009, "Handover procedures" and 3GPP TS 29.010, "Information element mapping between Mobile Station—Base Station System (MS-BSS) and Base Station System—Mobile-services Switching Centre (BSS-MSC); Signalling procedures and the Mobile Application Part (MAP)", where the target MSC is the IMS-MSC 86 serving the UE in the access point 50.

Figure 7:
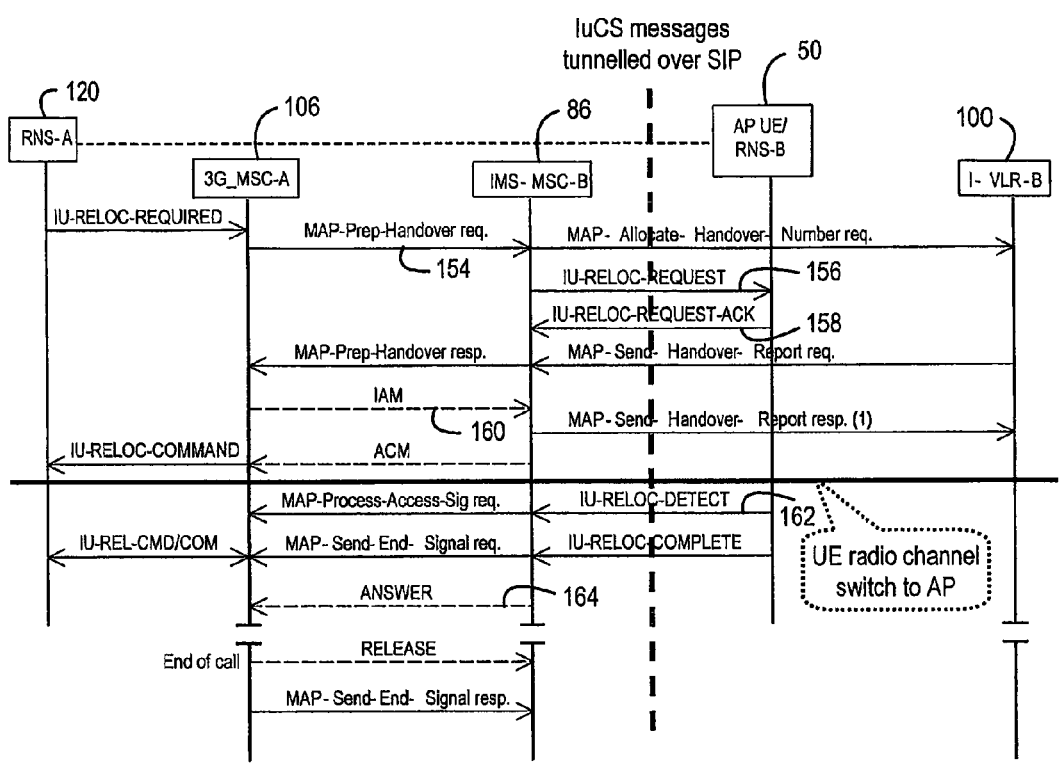
FIG. 7 illustrates a further handover procedure in accordance with an aspect of the present invention.

The UMTS signalling procedure on the IuCS and MAP-E interfaces is shown in FIG. 7. Specifically, with reference to FIG. 2, illustrating the UE 30 handing over from the base station 120 controlled by the RNS 122 to the access point 50, FIG. 7 shows the messages exchanged between the RNS-A 120, the 3G MSC-A 106, the IMS-MSC-B 86, the access point 50 (the AP UE/RNS-B), and the I-VLR-B 100.

Figure 8:
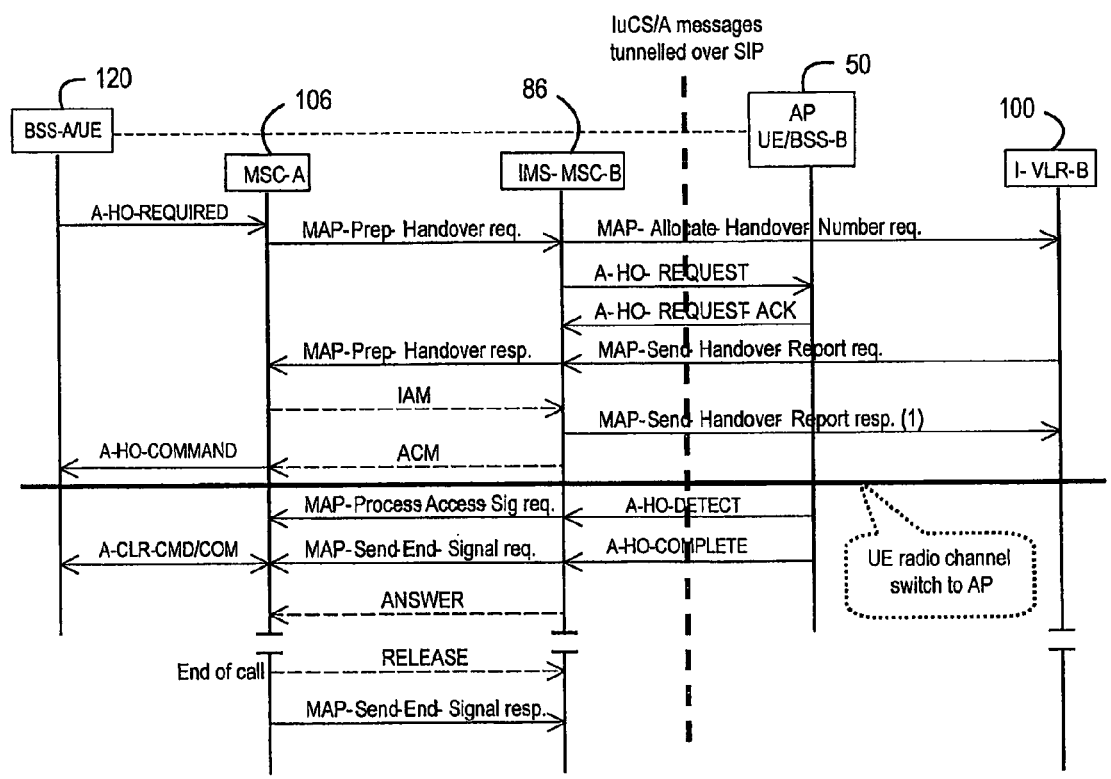
FIG. 8 illustrates a further handover procedure in accordance with an aspect of the present invention.

The GSM signalling procedure is shown in FIG. 8. Specifically, with reference to FIG. 2, illustrating the UE 30 handing over from the base station 120 controlled by the BSS 122 to the access point 50, FIG. 8 shows the messages exchanged between the BSS-A 120, the MSC-A 106, the IMS-MSC-B 86, the access point 50 (the AP UE/BSS-B), and the I-VLR-B 100.

The UMTS signalling procedure as shown in FIG. 7 is now described. As mentioned above, the handover procedure is generally similar to a conventional Inter-MSC handover procedure as described in the 3GPP specifications, and only the changes are described fully below. The GSM procedure, as shown in FIG. 8, is equivalent, and will not be described in detail.

The exchange of handover messages between the access point 50 and the IMS-MSC 86 is tunnelled over SIP. Each message is encapsulated into a SIP:MESSAGE as the payload.

At the reception of the MAP-Prep-Handover request message 154, the IMS-MSC 86 binds the signalling for the UE to the access point identity obtained by processing the cell ID information. In this way, the SIP signalling to the UE uses the SIP binding and IPsec tunnels related to the access point 50. If the IMS-MSC 86 cannot reach the access point 50, e.g. because the DSL modem in the home is shut down, then it rejects the handover request.

The access point 50 may be configured to handle calls only from particular mobile devices and, if so, the IMS-MSC 86 optionally also checks that the IMSI contained in the request is an allowed IMSI from the allowed subscribers list. In the event of a negative match it rejects the handover request.

When the access point 50 receives the IU-RELOC-REQUEST 156, it sets up a temporary association between the UE identity and the IMS-MSC for the remainder of the call. In order to speed up the handover, the access point 50 does not request a full registration procedure until after the call is finished. When the access point 50 receives the IU-RELOC-REQUEST message 156, it first checks that the IMSI contained in the request is an allowed IMSI from the access point 50 subscribers list. In the event of a negative match, it rejects the handover request. As mentioned above, the IMS-MSC 86 can optionally run this check before involving the access point 50. The access point 50 then stores the subscriber information as received in the IU-RELOC-REQUEST message 156 in the local database. This set of information includes the Encryption Information field specifying the encryption algorithm and the keying material. The access point 50 then sets both UE signalling and bearer transport to use IPsec tunnels and P-CSCF binding associated with the access point 50. From this moment on, the access point 50 routes locally the packets received on the IPsec tunnels between the UE clients and the core access point 50 functionality. The access point 50 then bypasses the local MSC functionality for the rest of the UE call.

As mentioned above, the access point 50 sends the IU-RELOC-REQUEST-ACK message 158 encapsulated in a SIP:MESSAGE.

If transcoder free operation is used in the MSC-A 106, then the IMS-MSC 86 uses transcoder free operation as defined in 3GPP TS 23.153, "Technical Specification Group Core Network and Terminals; Out of band transcoder control; Stage 2" to support the remainder of the call.

On reception of the IAM message 160, the IMS-MSC 86 sets up the binding in the MGW 92 between the PCM interface with 3G MSC-A 106 and the RTP/IP bearer connected to the access point 50 IP address.

When the UE 30 sends the first RLC message to the access point 50, the access point 50 completes the bearer binding locally and sends a IU-RELOC-DETECT message 162 encapsulated in a SIP:MESSAGE to the IMS-MSC 86.

After the ANSWER message 164, the MSC-A 106 is the anchor point for the call now served in the IMS-MSC 86.

At the call release, the access point 50 releases the temporary UE binding with the core network and the UE triggers a location registration procedure in the access point 50 to complete its relocation. From this moment, the UE 30 is served by the IMS-MSC 86.

The bearer switching will now be considered. Before the handover, the call bearer to the UE 30 is connected via a PLMN MSC 106. The handover procedure sets up a bearer between the PLMN MSC 106 and the MGW 92 controlled by the IMS-MSC 86, as shown in FIG. 7.

The IMS-MSC 86 commands the MGW 92 to bind the PCM interface for the UE 30 to the RTP/IP bearer connected to the access point 50 IP address target for the handover. If the PLMN MSC 106 is operating in transcoder free operation, then the IMS-MSC 86 commands the MGW 92 to avoid any transcoding, otherwise the IMS-MSC 86 commands the MGW 92 to set up a PCM to AMR transcoding.

The access point 50 sets up the UE bearer by using the current access point-related IPsec tunnel with the PDG.

The IMS-MSC 86 adds in the SIP:MESSAGE carrying the IU-RELOC-REQUEST message 156 an extension to specify the IP address and port number of the target MGW 92 for the access point 50 to set up the RTP/IP bearer binding for the UE 30 to that MGW 92.

The access point 50 adds in the SIP:MESSAGE carrying the IU-RELOC-REQUEST-ACK message 158 an extension to specify the IP address and port number for the UE client in the access point 50 for the MGW 92 to set up the RTP/IP bearer binding for the UE 30. The IP address is the same as the one assigned to the access point 50 at the PDG.

From the moment the first UE activity is detected in the access point 50, the access point 50 starts routing the received bearer packets on the IPsec tunnel associated with the access point 50. At this point, the UE 30 is circuit-switched connected via UMTS radio to the access point 50. The access point 50 converts CS voice frames from/into VoIP frames without transcoding (AMR frames encapsulated over RTP/IP).

After the handover, the PLMN MSC 86 remains as anchor MSC for the call until its release.

Thus, with suitable modification of the core network nodes, to define the IMS-MSC, handovers can be achieved. There is also provided a system allowing handovers from the access point 50 to the PLMN to be achieved without requiring modification of the core network.

In general terms, when the handover conditions are met, the access point 50 releases the current call with the UE 30 and it generates a new call to the UE 30 now camping on the PLMN. The access point call control mechanism keeps alive the existing call with the 3rd party, with a call transfer message and/or music, and reconnects the bearer when the new call to the UE now in the PLMN is answered.

In more detail, considering the case where the UE 30 is currently in connected state with the access point 50, for a call either originated or terminated with a 3rd party connected via the core network, and has reached the edge of the coverage area of the access point 50.

In this handover situation, the UE must delay as long as possible the start of the handover to the PLMN. This means that access point 50 signal threshold must be set to a fairly low value, i.e. to when the voice quality is seriously affected, so that the end-user has time to react in case of simply reduced voice quality by for example moving back to the place where it previously had a good signal. The hysteresis level is the same as in the general case.

When the above conditions are met, the access point 50 and the UE 30 start the handover procedure. The UE 30 can advantageously contain a USIM application for managing the handover. The USIM application is described in more detail below. The access point 50 must have a list of UEs that are provided with the USIM application and acts accordingly.

If the UE has the USIM application, the UE 30 releases the call with the access point 50 with a special release code and starts the cell-reselection procedure as described above. The access point 50, on the reception of this special release code, starts the procedure to call the UE via the PLMN as described below.

If the UE does not have the USIM application, the access point 50 releases the call to the UE with a code (which may be a normal code or a special code) and starts the procedure to call the UE via the PLMN as described below. On reception of the call release, the UE 30 starts the cell-reselection procedure as described below.

One possible cause of a handover is when the UE is in an active voice call connected to the access point 50 and completely loses the signal with the access point 50. This is a possible scenario with this handover solution as the handover decision is delayed to when the access point 50 signal is fairly low. From the moment the UE determines it has lost connectivity to the access point 50, it releases the call locally and starts a cell-reselection procedure as described below.

The USIM application, if present, can be used to shorten the interval between the loss of access point 50 connectivity until when the call is released and the cell reselection procedure started.

Similarly, the access point 50 determines that is has lost connectivity with the UE with an analogous timer and progresses with the handover actions described below.

After the call is released, the UE performs the cell reselection procedure in the same manner as the cell reselection procedure described above. Because of the way the access point 50 sets the handover triggering conditions, the outcome of the cell reselection is very likely to be that the UE camps on a PLMN cell. In that case, the cell-id of the PLMN cell has a different LAC and the UE performs a location registration procedure immediately after.

From the moment the access point 50 determines it has lost connectivity to the UE 30, either by direct release from the access point 50, by timer expiry or with the explicit release from the UE with a special code, the access point 50 puts the existing call with the 3rd party on hold with a music or announcement ("please hold the line, this call is being transferred", or the like), and starts a cycle of call attempts to the UE number via the core network. This cycle can last for a configurable time between 30 and 60 seconds and retries a call to the UE every few seconds.

At the moment the UE triggers the cell reselection, the UE is still registered in the HSS located in the access point 50, so all calls for that UE are routed back to the access point 50 itself until the UE has successfully completed the location registration in the PLMN. The access point 50 can discard the calls that are routed back to the access point 50 itself and retry after the retry timer.

In case no answer is obtained from the UE within the time specified to complete the call attempts cycle, the access point 50 releases the call to the 3rd party, optionally with an additional announcement ("sorry, your call could not be reconnected", or the like).

If the 3rd party releases the call at any time, the access point 50 stops the call attempts procedure and releases all resources.

When the UE has successfully completed the location registration in the PLMN, the next call from the access point 50 is successfully routed to the UE. If the USIM application is present, the USIM application automatically answers the incoming call received with the access point 50 number as calling party (a short ring tone can be provided to notify the end-user that the connection is up again). If the USIM application is not present, the UE treats the incoming call as a normal call, optionally with a differentiated ring-tone tied to the access point 50 number. This requires that the UE end-user answers the call explicitly before the call is reconnected.

When the access point 50 receives the successful call setup notification from the UE now camped on the PLMN, it stops playing the music/announcement to the 3rd party, and connects the 3rd party bearer with the new call leg with the UE 30. From this moment on, the access point 50 trombones the call with the UE 30 until the call is released.

As mentioned above, the outcome of the cell reselection is very likely to be that the UE camps on a PLMN cell. However, where the UE 30 that camps again on the access point 50, and reactivates the RRC connection to the access point 50 while the access point 50 is still performing the handover procedure, the access point 50 immediately releases any active UE call attempt with the core network and sends a call setup to the UE locally. This call can be treated in different ways. If the USIM application is present, the USIM application automatically answers the call, optionally with a brief ring tone to notify the end user that the connection is up again. If the USIM application is not present, the UE treats the new call from the access point 50 as a normal call, optionally with a differentiated ring tone tied to the access point 50 number.

When the UE answers the new call, the access point 50 behaves as if it has received the successful call setup notification from the UE, although in this case the access point 50 does not trombone the call.

As mentioned above, the UE may have a USIM application to assist in managing the handover from the access point 50 to the PLMN, without requiring any modification of the core network. The USIM application detects it is in "home mode" automatically, interpreting the access point 50 cell-id.

The USIM application has a short list of known good neighbour cells (up to a maximum of 10, but preferably about 3) when it is in "home mode". These are the cells measured in the reports and are the possible targets of the handover. The list could be sent from the access point 50.

If the handover conditions are met (that is, the access point 50 signal is below a threshold, and the PLMN cell signal is better than the access point 50 signal by the hysteresis margin) then the USIM application drops the call to the access point 50, or sends a DTMF/SMS message with a command and then drops the call to the access point 50. It then selects the PLMN cell to camp on from the known good neighbour list, immediately starts the location registration, and waits for an incoming call at completion of the location registration.

If the incoming call is received within a configurable time (for example of 30-60 s), and the caller ID is the access point 50 MSISDN, it automatically answers to reconnect with a brief ring tone to notify the end user that the call is up again.

The USIM application can communicate with the access point 50 by means of SMS updates.

Thus, this handover method can be improved by means of the USIM application. Specifically, there is an improvement in the performance of the handover, i.e. in the delay between when the call with the access point 50 is lost and when the call in the PLMN is reconnected. The USIM application can speed up the handover procedure by shortening the interval in which the UE tries to keep connectivity with the access point 50 when the call bearer is lost, by scanning only the known good neighbour cells in the provisioned list, and by automatically answering the call received in the PLMN.

The 3G L-UMA handover solution will now be described. The solution is described with reference to UMTS technology, but applies equally to the GSM technology, where the IuCS, 3G L-UMA and Uu messages are replaced by the analogous messages on the A, 2G L-UMA and Um interfaces respectively.

UMTS handovers can involve different core network elements depending on the topology of the network and the connectivity of the neighbour cells. The solution described here is based on an Inter-RNC, Intra-MSC (IuCS-based) handover. This solution requires that the 3G L-GANC acts as a PLMN RNC for the receiving and sending of handover messages on the IuCS interface to the PLMN MSC. This interface is already used for all the remaining CS support, and the handover messages to/from the MSC can be kept at standards. The 3G L-GANC encapsulates the handover messages over 3G L-UMA messages to the access point and vice versa.

This solution does not require additional concentrators or features in the legacy CN systems.

If the RNC and 3G L-GANC serving MSCs do not overlap, so that the UE moving between the ZAP and PLMN needs to change serving MSC, an Inter-MSC handover (Iu-based) may be required. The procedure can follow the Inter-RNC handover introduced in the paragraph above with additionally, the 3GPP defined Inter-MSC messages.

The general principles for the 3G L-UMA handover solution described here are:

It is based on the Inter-RNC handover procedure;

The 3G L-GANC and the access point are seen as the RNC in the handover procedures respectively by the MNO core network and by the UE with fully standard interfaces;

The 3G L-GANC and the access point use 3G L-UMA messages encapsulation to exchange the IuCS handover messages;

For the PLMN to ZAP handover, the 3G L-GANC and the access point postpone the UE registration until after the active call is released. Both 3G L-GANC and access point apply IMSI screening before accepting the call handover. During the active call management, the access point makes use of the existing access point security association and IPsec tunnel to secure the UE access to the 3G L-GANC.

FIG. 9 is a block schematic diagram of a mobile communications network, in which the access point (AP) 50 is connected into the core network using a modified version of the existing standard UMA interface to support backhaul. This is referred to herein as 3G Licensed UMA (L-UMA) or 3G L-UMA. The principal aim of the ZoneGate 3G L-UMA solution is to provide to UMTS UE's camping on the ZoneGate Access Point (ZAP) seamless access to both 3GPP CS and PS-based services over a generic IP access network. In FIG. 9, the access point (AP) 50 also includes the functionality of the IP Gateway 60 shown in FIG. 1.

The UMA or 3GPP GAN standard defines an interface between the GANC controller and the UE, the Up interface. The Up interface is enhanced in order to cover licensed access points and UMTS technology in what this document calls the Up' interface. The access point 50 uses the standardised messaging plus enhancements on the Up' interface to register and authenticate itself as a Mobile device and set up a secure IPSec tunnel to the core network.

FIG. 9 shows a single UE 30, although multiple UEs can camp on a single access point 50. The UEs are 3GPP standard UMTS UEs with no additional client. They can be handsets, PDAs, PC cards or any other form factor.

The POTS or SIP phone 62 is used to make home number calls via the access point 50.

The PC client 44 controls local services preferences, contacts and dynamic calls/sessions behaviour. A softphone functionality can be included in the PC client.

The access point 50 provides the following functions:—

It provides local UMTS coverage at 3GPP standards.

It includes a USIM 180 dedicated to the access point 50 provisioning, configuration, authentication with the core network and to support UMTS services for the home number service.

It interfaces with multiple UEs 30 over the 3GPP standard Uu interfaces, terminating locally AS and NAS layers.

It interfaces with local POTS or SIP phone 62 over a POTS interface or home network/Ethernet interface to a standalone VoIP (SIP) phone.

It interfaces with local PC client 44 and softphone over IP via an Ethernet interface 82.

It interfaces with other local or remote access points 182 via the Itf-Zz interface.

It delivers local services without CN network signalling involvement, including local calls treatment and local internet offload.

It interfaces with the L-GANC 184 over the Up' interface, via the Generic IP Access Network 70, for RRC-equivalent signalling and keying material exchange.

It interfaces with the CN legacy NEs (MSC 186, SGSN 188) on the 3GPP standard Uu (NAS) interface, via the Up' interface, for the NAS layers signalling (MM, CC/SS/SMS, GMM, SM).

It interfaces with the management system (ZMS) 74 over the Itf-Z interface, via the Generic IP Access Network 70 and L-GANC Security Gateway 190, for network management, services management, software upgrades, fault reporting, activity monitoring and troubleshooting. The Itf-Z is connected via the L-GANC Security Gateway 190.

It interfaces with the public data network and the Internet 192 over the Gi-L (local Gi) interface, to provide direct access to local data and local internet offload service without core network involvement.

The Generic IP Access Network 70 provides IP connectivity between the access points 50, 182 and the 3G L-GANCs 184 and between the access points 50, 182 and the internet 192. The Generic IP Access Network may apply NAT/PAT, and is generally conventional.

The 3G L-GANC 184 is the UMTS Licensed Generic Access Network Controller. The 3G L-GANC 184 provides the following functions:

It provides functionality equivalent to that of the RNC in the UMTS architecture.

It provides secure access over the Generic IP Access Network 70 to the core network.

It includes a standard Security Gateway 190 for authentication and IPsec tunnelling.

It interfaces with the core network AAA 194 over the 3GPP standard Wm interface, for the support of authentication, authorisation and accounting procedures.

It interfaces with multiple access points 50, 182 over the Up' interface, via the Generic IP Access Network 70, for RRC-equivalent signalling and keying material exchange.

It provides a secure transport for the Itf-Z between the access point 50 and the ZMS 74.

It interfaces with the core network MSC 186 over the 3GPP standard Iu-CS interface, for the support of circuit switched services.

It interfaces with the core network SGSN 188 over the 3GPP standard Iu-PS interface, for the support of packet switched services.

It provides a secure transport for the 3GPP standards Uu (NAS) interface between the access point 50 and the core network MSC 186 and SGSN 188.

It interfaces with the core network SMLC 196 over the 3GPP standards Lb interface, for the support of location information for the UEs roaming in the access point network It interfaces with the core network CBC 198 over the 3GPP standards CBC-RNC interface for supporting cell broadcast services.

The management system (ZMS) 74 provides OAM&P function for the access point 50.

More specifically:

It manages the access point 50 using the procedures and methods described in the DSL Forum TR-069 specifications.

It is responsible for the provisioning of the access point 50 during the installation process.

It monitors for faults reported by the managed access points.

It provides a means for the operator to manage the configuration of each access point 50.

It provides user interface with security to restrict the functions to which the user has access.

It interfaces with the access point 50 over the Itf-Z using a secure IP connection.

It provides the means to manage the upgrade of the software for the access points.

It collects the performance metrics reported by the access points.

It interfaces Customer Care, and network operations centre.

The UMTS core network elements MSC 186, SGSN 188, MA 194, and HLR/HSS 200 are 3GPP standards elements, and will not be described further.

Figure 10:
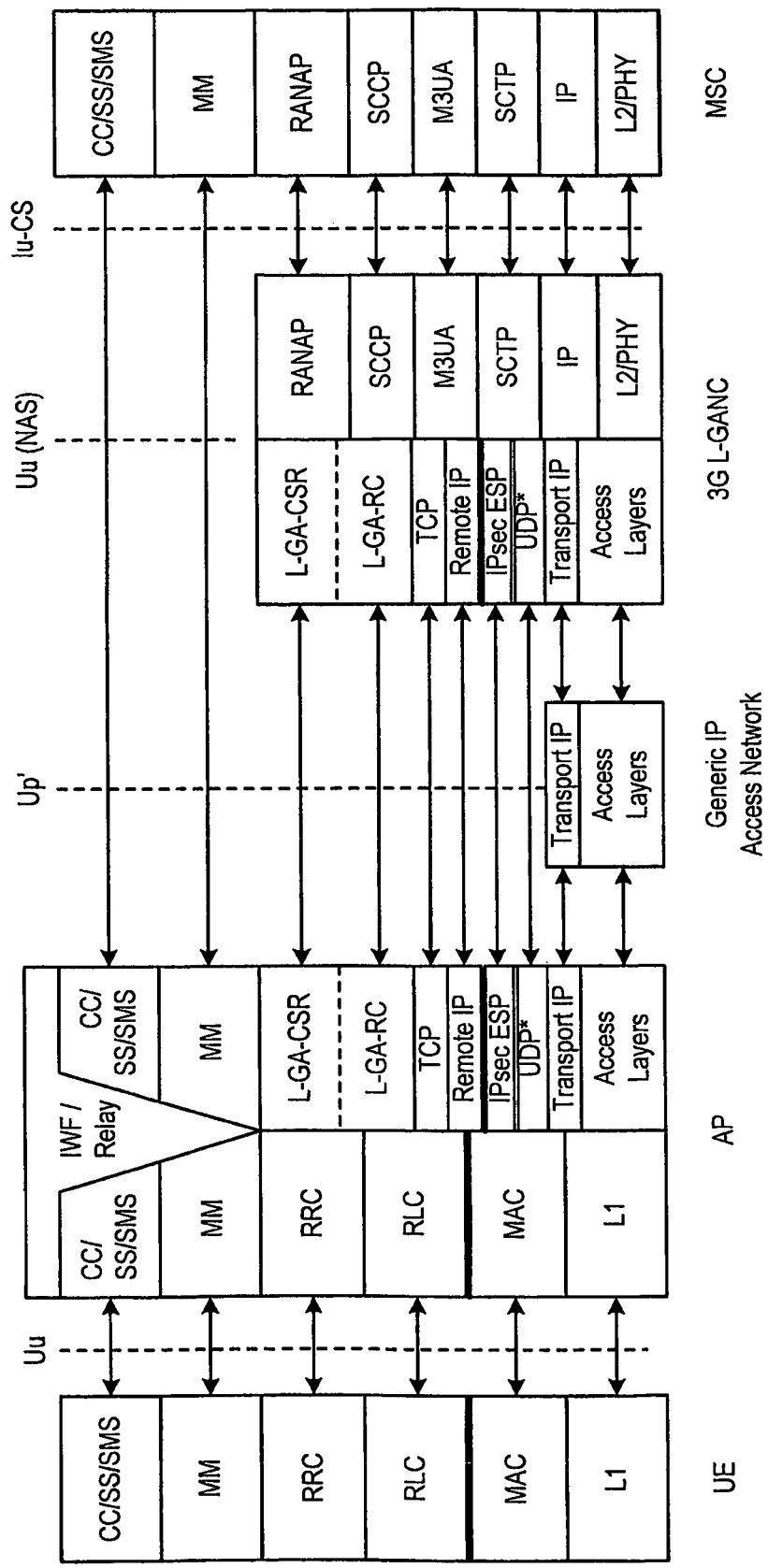
FIG. 10 illustrates the communications between components of the network of FIG. 9.

FIG. 10 illustrates the 3G L-UMA CS domain control plane, in which communications between the UE and the AP, between the MSC and the 3G L-GANC, and between the MSC and the AP are in accordance with the UMTS 3GPP standards parts, communications between the AP and the 3G L-GANC over the IP Access Network using TCP and lower levels are in accordance with conventional IP networking, and the L-GA-CSR and L-GA-RC layers are 3G L-UMA extensions.

The Uu interface is between the 3G UE and the access point (AP). The AP supports the AS and NAS UMTS layers with the UE, as defined in the 3GPP standards, with backward compatibility for R99/R4 UEs.

The Up' interface is between the AP and the 3G L-GANC. The L-GA-CSR and L-GA-RC protocols are extensions to the current GAN standards, 3GPP TS 43.318, "Generic access to the A/Gb interface; Stage 2", to support Licensed UMTS access points (3G L-UMA solution), respectively replacing GA-CSR and GA-RC. Additionally, the L-GA-CSR protocol must support the exchange of the keying material with the AP.

The Up' interface transport is via the IPsec ESP tunnel. One tunnel per AP is set up. Optionally, other transport layers can be used, as PPP, L2TP or PVCs, in case a secure access network is available.

The Iu-CS interface is between the 3G L-GANC and the 3G MSC. The protocol stack shown in FIG. 10 is referred to a R5 MSC with Iu-CS over IP. For the R99/R4 UMTS MSC, the 3GPP standards 3GPP TS 25.410, "UTRAN Iu Interface: general aspects and principles" and 3GPP TS 25.413, "Technical Specification Group Radio Access Network; UTRAN Iu interface RANAP signalling" define IuCS over ATM with the following protocol stack: MTP3b, SSCF-NNI, SSCOP, AAL5 over ATM.

The Uu (NAS) interface is between the AP and the 3G MSC. The AP interfaces the MSC as a proxy of the 3G UE, with an interworking function for AP local calls treatment and selective relay of NAS layers messages between UE and MSC, with most of the NAS messages related to core network services being relayed unchanged. The local call treatment procedures do not involve core network elements.

The Uu (NAS) interface is supported transparently through the Up' interface and Iu-CS interface via the 3G L-GANC.

FIG. 11 illustrates the 3G L-UMA CS domain user plane, in which communications between the UE and the AP, and between the MSC and the 3G L-GANC, are in accordance with the UMTS 3GPP standards parts, communications between the AP and the 3G L-GANC over the IP Access Network using RTP/UDP and lower levels are in accordance with conventional IP networking, and the codec and rate adaptation layer is a 3G L-UMA extension.

The Uu interface is between the 3G UE and the AP. The AP supports the AS UMTS layers and the AMR/video codec layer with the UE, as defined in the 3GPP standards, with backward compatibility for R99/R4 UEs. No transcoding is necessary to support 3G UEs.

The Up' interface is between the AP and the 3G L-GANC. The Codec/rate adaptation layer is the proposed extension to the current GAN standard 3GPP TS 43.318, "Generic access to the A/Gb interface; Stage 2" to support Licensed UMTS access points. The Up' interface transport is via the IPsec ESP tunnel.

The Iu-CS interface is between the 3G L-GANC and the 3G MSC. The protocol stack shown in FIG. 11 is referred to a R5 MSC with Iu-CS over IP. For the R99/R4 UMTS MSC, the 3GPP standards 3GPP TS 25.410, "UTRAN Iu Interface: general aspects and principles" and 3GPP TS 25.413, "Technical Specification Group Radio Access Network; UTRAN Iu interface RANAP signalling" define IuCS over ATM with the following protocol stack: AAL2 over ATM.

The security and registration procedures relevant for the 3G L-UMA handover support are defined below.

In order to achieve AP—3G L-GANC security and registration, the AP authenticates with CN Security GW (USIM-based authentication) and sets up the IPsec ESP tunnel, and then the AP registers with the 3G L-GANC.

In order to achieve UE security and registration, the UEs are screened for access locally by the AP (by IMSI), and then the AP instantiates the 3G L-UMA client for the UE (transparently to the UE itself). From this moment, the UE signalling with the CN is carried over 3G L-UMA layers and the AP IPsec tunnel. The UE then registers with the 3G L-GANC, and then authenticates with CN MSC for call services, with the AP acting as a proxy, using USIM-based MM-layer authentication with MSC/SGSN.

Ciphering on the radio interface between the UE and the AP is achieved in that the 3G L-GANC captures the UE ciphering material (Ik, Ck and algorithm used) during the MM authentication procedure, and the MSC sends them to the 3G L-GANC in the RANAP Security Mode Command. The 3G L-GANC then forwards the UE ciphering material (Ik, Ck and algorithm used) to the AP on 3G L-UMA extensions of current GA-CSR (URR) messages.

FIG. 12 shows the message flow for a MM Location Area Update procedure and Ciphering for a UE camping on the AP, using the 3G L-UMA networking solution. For a circuit-switched registration, the following procedures are followed:

1201—The AP and the 3G L-GANC have already set-up the IPsec ESP tunnel.

1202—The UE may perform a PLMN and/or cell selection/reselection in idle mode by sending a LOCATION UPDATING REQUEST message to the AP. The message may contain the UE's IMSI or TMSI.

1203—The identification procedure may be initiated by the AP in order to obtain the IMSI from the UE in the event only a TMSI was received in the LOCATION UPDATING REQUEST message.

1204—On successful establishment of the IPsec tunnel, the AP generates and sends the URR REGISTER REQUEST message to the 3G L-GANC in order to register the UE on to the 3G L-GANC. We assume that the serving 3G L-GANC has already been discovered by the AP.

1205—The URR REGISTER ACCEPT message is received from the 3G L-GANC indicating that the UE has successfully registered onto the 3G L-GANC.

1206—The original LOCATION UPDATING REQUEST message received from the UE is transferred to the 3G L-GANC in the URR UL DIRECT TRANSFER wrapper.

1207—The 3G L-GANC transfers the LOCATION UPDATING REQUEST to the MM sub-layer in the MSC.

1208—Authentication and ciphering are enabled in the 3G MSC. The MM sub-layer generates the AUTHENTICATION REQUEST message containing the 3G RAND and AUTN parameters.

1209—The 3G L-GANC generates and sends the URR DL DIRECT TRANSFER message containing the AUTHENTICATION REQUEST to the AP.

1210—The AP receives the URR DL DIRECT TRANSFER and sends the AUTHENTICATION REQUEST message to the UE.

1211—The UE performs the 3G authentication procedure, and generates the RES, which is sent to the AP in the AUTHENTICATION RESPONSE message.

1212—The AP sends the AUTHENTICATION RESPONSE message in the URR UL DIRECT TRANSFER to the 3G L-GANC.

1213—The 3G L-GANC receives the URR UL DIRECT TRANSFER and sends the AUTHENTICATION RESPONSE message to the MSC.

1214—The RES contained in the AUTHENTICATION RESPONSE is validated in the MSC. The ciphering is enabled by sending the Security Mode command to the 3G L-GANC, which should contain the Ck and Ik Ciphering and Integrity keys.

1215—The 3G L-GANC sends the ciphering and integrity information in a modified URR CIPHERING MODE COMMAND to the AP.

1216—The AP generates the SECURITY MODE COMMAND message containing the UEA (ciphering algorithm), UIA (integrity algorithm), FRESH and MAC-I information. Note that the UEA, UIA, FRESH, and MAC-I could be sourced from the AP.

1217—The SECURITY MODE COMPLETE message is sent from the UE to the AP.

1218—The AP generates the modified URR CIPHERING MODE COMPLETE message.

1219—The 3G L-GANC sends the CIPHER MODE COMPLETE message to the MSC.

1220—The MSC sends the LOCATION UPDATING ACCEPT message to the 3G L-GANC.

1221—The 3G L-GANC sends the URR DL DIRECT TRANSFER message to the AP containing the LOCATION UPDATING ACCEPT.

1222—The AP sends the LOCATION UPDATING ACCEPT to the UE to complete the registration procedure.

When a UE starts the handover procedure from the AP to the PLMN, this is seen by the UE as a normal handover. The procedure followed in the core network is the same as in the basic intra-3G_MSC SRNS Relocation Procedure combined with hard change of radio resources (Hard Handover with switch in the Core Network) as defined in 3GPP TS 23.009, "Handover procedures". FIG. 13 illustrates the full procedure.

The exchange of IuCS handover messages between the AP and the 3G L-GANC is tunnelled over 3G L-UMA messages. The AP supports a local RNC for local calls treatment. When the handover conditions are met, the AP RNC handover messages are sent to the 3G L-GANC using the 3G L-UMA tunnelling explained above.

Firstly (step 1301), the AP sends the IU-RELOC-REQUIRED message to the 3G L-GANC serving the UE encapsulated in a 3G L-UMA message. This message includes the ciphering material information (Ik, Ck and applied algorithm). In step 1302, the 3G L-GANC forwards the message as a standard IuCS message to the MSC for the continuation of the procedure according to the standards.

At the reception of the IU-RELOC-COMMAND (step 1303), the 3G L-GANC forwards the full message (at step 1304) to the AP serving the UE encapsulated in a 3G L-UMA message.

At the reception of the IU-RELOC-COMMAND encapsulated in a 3G L-UMA message, the AP sends (at step 1305) the RR-HO-COMMAND message to the UE. The UE switches to the PLMN cell at this stage. The procedure follows the standards procedure until after the PLMN RNS has notified the relocation complete to the MSC.

At the reception of the IU-RELEASE-COMMAND (step 1306), the 3G L-GANC forwards (at step 1307) the full message to the AP that was serving the UE before the handover started, encapsulated in a 3G L-UMA message. At the reception of the IU-RELEASE-COMMAND encapsulated in a 3G L-UMA message, the AP clears the UE voice bearer with the UE and 3G LGANC, de-instantiates the UE 3G L-UMA client, and deregisters the UE.

At the call release, the UE triggers a location registration in the PLMN to complete its relocation. Optionally, the AP and the 3G L-GANC can keep a dormant profile for the UE in order to speed up any possible subsequent UE relocation in the AP coverage.

Considering the bearer switching, before the handover, the call bearer to the AP UE is connected via the 3G L-GANC to the MSC. The UE is circuit-switched connected via UMTS radio to the AP. The AP converts CS voice frames from/into VoIP frames without transcoding (AMR frames encapsulated over RTP/IP). The AP connects to the 3G L-GANC via RTP/IP using the existing IPsec tunnel with the SeGW. Depending on the IuCS protocol stack used, the 3G L-GANC connects the bearer over IP or over ATM to the MSC.

During the handover procedure, a new CS bearer is set-up on the PLMN to the MSC. When this bearer is ready, the MSC sends the relocation command to the UE via the 3G L-GANC and the AP.

After the handover, the 3G-LGANC and the AP release the bearer to the MSC and the UE.

When the UE starts a handover procedure from the PLMN to the AP, this is seen by the UE as a normal handover. The procedure followed in the core network is the same as in the basic intra-3G_MSC SRNS Relocation Procedure combined with hard change of radio resources (Hard Handover with switch in the Core Network) as defined in 3GPP TS 23.009, "Handover procedures". FIG. 14 illustrates the full procedure.

The AP has already registered with the core network 3G L-GANC before it starts to offer UMTS service, and in doing that it has set up the IPsec security with the SeGW in 3G L-GANC.

The exchange of IuCS handover messages between the AP and the 3G L-GANC is tunnelled over 3G L-UMA messages. When the handover conditions are met (step 1401), the RNS-A sends the relocation required message to the MSC. The AP is assigned a cell ID that maps into a LAI reserved for access point services. The LAI is uniquely mapped to a 3G L-GANC, so that the MSC can determine the target 3G L-GANC using the standard procedure. The AP supports a local RNC, which is used as the target RNS for this case of handover.

At the reception of the IU-RELOCATION-REQUEST (step 1402), the 3G L-GANC checks that the UE is authorised for 3G L-UMA services. If it is not authorised, it rejects the relocation command, but, if it is authorised, it implicitly registers the UE and forwards the full message (step 1403) to the target AP encapsulated in a 3G L-UMA message over the AP IPsec tunnel.

If the 3G L-GANC cannot reach the AP, e.g. because the DSL modem in the customer's premises is shut down, then it rejects the handover request.

At the reception of the IU-RELOCATION-REQUEST, the AP checks that the UE is authorised for AP services (authorised IMSI list check). If it is not authorised, it rejects the relocation command, but, if it is authorised, it implicitly registers the UE and prepares the CS bearer with the 3G L-GANC over the AP IPsec tunnel.

The IU-RELOCATION-REQUEST message includes the ciphering material information (Ik, Ck and applied algorithm), which is stored in the AP internal database for the UE service.

In order to speed up the handover, the AP does not request a full registration procedure until after the call is released.

In step 1404, the AP sends the IU-RELOC-REQUEST-ACK to the 3G L-GANC encapsulated in a 3G L-UMA message, and at step 1405 the 3G L-GANC forwards the IU-RELOC-REQUEST-ACK message as a standard IuCS message to the MSC for the continuation of the procedure according to the standards.

After the reception of the handover command (step 1406), when the UE sends the first RLC message to the AP, the AP completes the bearer binding locally and sends a IU-RELOC-DETECT message (step 1407) to the 3G L-GANC encapsulated in a 3G L-UMA message.

At the reception of the RR-HO-COMPLETE message (step 1408) from the UE, the AP sends a IU-RELOC-COMPLETE message (step 1409) to the 3G L-GANC encapsulated in a 3G L-UMA message. The 3G L-GANC forwards the IU-RELOC-COMPLETE message (step 1410) as a standard IuCS message to the MSC for the continuation of the procedure according to the standards.

At the call release, the UE triggers a location registration in the AP to complete its relocation. During this procedure, the UE may be re-authenticated by the MSC, in which case the AP receives the new ciphering material via the 3G L-GANC. Note that the AP does not support the trace commands and, if received, it is ignored by the 3G L-GANC.

Considering the bearer switching, before the handover, the call bearer to the UE is connected via the PLMN RNS and MSC.

During the handover procedure, a new CS bearer is set-up via the AP and 3G L-GANC to the MSC. The AP converts CS voice frames from/into VoIP frames without transcoding (AMR frames encapsulated over RTP/IP). The AP connects to the 3G L-GANC via RTP/IP using the existing IPsec tunnel with the SeGW. Depending on the IuCS protocol stack used, the 3G L-GANC connects the bearer over IP or over ATM to the MSC. When this bearer is ready, the MSC sends the relocation command to the UE via PLMN RNS.

At the UE activity detection in the AP, the AP completes the bearer binding between the UE RAB and the core network bearer previously set-up.

After the handover, the MSC releases the bearer to the PLMN RNS.

There are therefore described mechanisms for performing a handovers between an access point and a network node. The mechanisms described herein relate to the situation where there is a SIP interface between the access point 50 and the core network, and in the case where there is a 3G L-GAN (UMA, or Unlicensed Mobile Access) interface.

The invention claimed is:

1. A mobile communications network, comprising:
   a Public Land Mobile Network (PLMN), comprising a plurality of network nodes;
   a core network anchor node; and
   an access point, serving as a basestation in the mobile communications network, and configured to establish a tunneling connection over a public wide area network to the core network anchor node, wherein the core network anchor node is configured to establish signaling and bearer connections with the access point such that, in the event of a handover between the access point and another of the network nodes of the PLMN, handover information is sent between the access point and the other of the network nodes of the PLMN over the public wide area network, wherein the handover information is sent through the tunneling connection over the public wide area network rather than over a dedicated line, and wherein the access point has a Universal Subscriber Identity Module (USIM) interface, with a tunneling connection to the core network anchor node while the access point is active, such that the core network anchor node is able to send handover information to the access point using said tunneling connection, without requiring a mobile device to perform a registration procedure with the access point before handover from the other of the network nodes of the PLMN to the access point.

2. A mobile communications network as claimed in claim 1, wherein, in the event of a handover from the other of the network nodes of the PLMN to the access point, the other of the network nodes of the PLMN is adapted to send handover information to the core network anchor node, and the core network anchor node is adapted to send handover information to the access point.

3. A mobile communications network as claimed in claim 2, wherein the core network anchor node is adapted to send the handover information to the access point over the public wide area network embedded in a Session Initiation Protocol (SIP) message.

4. A mobile communications network as claimed in claim 2, wherein the core network anchor node is adapted to send the handover information to the access point over the public wide area network embedded in a Unlicensed Mobile Access (UMA) message.

5. A mobile communications network as claimed in claim 1, wherein, in the event of a handover from the access point to another of the network nodes of the PLMN, the core network anchor node is adapted to send handover information to the other of the network nodes of the PLMN, and thereafter is adapted to send a handover message to the access point.

6. A mobile communications network as claimed in claim 5, wherein the core network anchor node is adapted to send the handover message to the access point over the public wide area network embedded in a Session Initiation Protocol (SIP) message.

7. A mobile communications network as claimed in claim 5, wherein the core network anchor node is adapted to send the handover message to the access point over the public wide area network embedded in an Unlicensed Mobile Access (UMA) message.

8. A mobile communications network as claimed in claim 1, wherein, in the event of a handover of a User Equipment (UE) from the access point to the other of the network nodes of the PLMN, the access point generates a new call to the PLMN to reach the UE now moved under PLMN coverage and reconnects the call to the other party.

9. A core network node for use in a mobile communications network, wherein the core network node comprises an IP Multimedia Subsystem-Mobile Switching Center (IMS-MSC), the IMS-MSC being adapted to establish a tunneling connection over a public wide area network to an access point, serving as a basestation in the mobile communications network, wherein the core network node is configured to establish signaling and bearer connections with the access point such that, in the event of a handover between the access point and another of the network nodes of the Public Land Mobile Network (PLMN), handover information is sent between the access point and the IMS-MSC over the public wide area network, wherein the handover information is sent through the tunneling connection over the public wide area network rather than over a dedicated line, and wherein the access point has a Universal Subscriber Identity Module (USIM) interface, with a tunneling connection to the core network anchor node while the access point is active, such that the core network anchor node is able to send handover information to the access point using said tunneling connection, without requiring a mobile device to perform a registration procedure with the access point before handover from the other of the network nodes of the PLMN to the access point.

10. A core network node for use in a mobile communications network, wherein the core network node comprises a Session Initiation Protocol-Mobile Switching Center (SIP-MSC), the SIP-MSC being adapted to establish a tunneling connection over a public wide area network to an access point, serving as a basestation in the mobile communications network, wherein the core network node is configured to establish signaling and bearer connections with the access point such that, in the event of a handover between the access point and another of the network nodes of the Public Land Mobile Network (PLMN), handover information is sent between the access point and the SIP-MSC over the public wide area network, wherein the handover information is sent through the tunneling connection over the public wide area network rather than over a dedicated line, and wherein the access point has a Universal Subscriber Identity Module (USIM) interface, with a tunneling connection to the core network anchor node while the access point is active, such that the core network anchor node is able to send handover information to the access point using said tunneling connection, without requiring a mobile device to perform a registration procedure with the access point before handover from the other of the network nodes of the PLMN to the access point.

11. A core network node for use in a mobile communications network, wherein the core network node comprises a Licensed Generic Access Network Controller (L-GANC), the L-GANC being adapted to establish a tunneling connection over a public wide area network to an access point, serving as a basestation in the mobile communications network, wherein the core network node is configured to establish signaling and bearer connections with the access point such that, in the event of a handover between the access point and another of the network nodes of the Public Land Mobile Network (PLMN), handover information is sent between the access point and the L-GANC over the public wide area network, wherein the handover information is sent through the tunneling connection over the public wide area network rather than over a dedicated line, and wherein the access point has a Universal Subscriber Identity Module (USIM) interface, with a tunneling connection to the core network anchor node while the access point is active, such that the core network anchor node is able to send handover information to the access point using said tunneling connection, without requiring a mobile device to perform a registration procedure with the access point before handover from the other of the network nodes of the PLMN to the access point.

12. A method of achieving a handover in a mobile communications network, wherein the mobile communications network comprises a Public Land Mobile Network (PLMN), having a plurality of network nodes, a core network anchor node, and an access point, serving as a basestation in the mobile communications network, wherein the basestation is connected over a public wide area network to the core network anchor node, the method comprising:
  determining in the access point that a handover between the access point and another of the network nodes of the PLMN is required, and
  sending handover information between the access point and the core network anchor node over the public wide area network, the handover information sent through a tunneling connection over the public wide area network rather than over a dedicated line, wherein the core network anchor node is configured to establish signaling and bearer connections with the access point, wherein the handover information initiates and controls the handover, and wherein the access point has a Universal Subscriber Identity Module (USIM) interface, with a tunneling connection to the core network anchor node while the access point is active, such that the core network anchor node is able to send handover information to the access point using said tunneling connection, without requiring a mobile device to perform a registration procedure with the access point before handover from the other of the network nodes of the PLMN to the access point.

13. A method as claimed in claim 12, comprising sending information between the access point and the core network anchor node over the public wide area network embedded in respective Session Initiation Protocol (SIP) messages.

14. A method as claimed in claim 12, comprising sending information between the access point and the core network anchor node over the public wide area network embedded in respective Unlicensed Mobile Access (UMA) messages.

15. A method as claimed in claim 12, wherein the core network anchor node comprises an IP Multimedia Subsystem-Mobile Switching Center (IMS-MSC), the IMS-MSC being adapted to establish a tunneling connection over a public wide area network to an access point, serving as a basestation in the mobile communications network, such that, in the event of a handover between the access point and another of the network nodes of the PLMN, handover information is sent between the access point and the IMS-MSC over the public wide area network.

16. A method as claimed in claim 12, wherein the core network anchor node comprises a Session Initiation Protocol-Mobile Switching Center (SIP-MSC), the SIP-MSC being adapted to establish a tunneling connection over a public wide area network to an access point, serving as a basestation in the mobile communications network, such that, in the event of a handover between the access point and another of the network nodes of the PLMN, handover information is sent between the access point and the SIP-MSC over the public wide area network.

17. A method as claimed in claim 12, wherein the core network anchor node comprises a Licensed Generic Access Network Controller (L-GANC), the L-GANC being adapted to establish a tunneling connection over a public wide area network to an access point, serving as a basestation in the mobile communications network, such that, in the event of a handover between the access point and another of the network nodes of the PLMN, handover information is sent between the access point and the L-GANC over the public wide area network.

18. A method as claimed in claim 8, wherein the access point retries to set-up the new call for a configurable set of retries over a period of time.

19. A method as claimed in claim 8, wherein the access point decides to attempt a handover in case the UE becomes unreachable to the access point during an active call.

20. A method as claimed in claim 18, wherein the access point stops retrying to set up said new call if the UE camps again on access point, generates a new call to the UE and reconnects the call to the other party.

21. A method as claimed in claim 8, wherein the access point plays announcements to the other connected party until the new call to UE is reconnected.

22. A method as claimed in claim 8, wherein the UE is provisioned with a Universal Subscriber Identity Module (USIM) application that performs faster cell reselection of the macro network cell by searching only within a short list of cell identifiers specified by the access point.

23. A method as claimed in claim 22, wherein the USIM application automatically answers to the call generated by the access point in order to speed up the reconnection of the call.

24. A mobile communications network, comprising:
a Public Land Mobile Network (PLMN), comprising a plurality of network nodes;
a core network anchor node; and
an access point, serving as a basestation in the mobile communications network,
wherein the core network anchor node is connected to said network nodes by Mobile Application Part (MAP) interfaces,
wherein the access point has a Universal Subscriber Identity Module (USIM) interface adapted to establish a tunneling connection over a public wide area network to the core network anchor node while the access point is active, such that the core network anchor node is able to send handover information to the access point using said tunneling connection, without requiring a mobile device to perform a registration procedure with the access point before handover from the other of the network nodes of the PLMN to the access point,
wherein the core network anchor node provides an interworking function between said tunneling connection and said MAP interfaces, and
wherein the core network anchor node is configured to establish signaling and bearer connections with the access point such that, in the event of a handover between the access point and another of the network nodes of the PLMN, handover information is sent between the access point and the other of the network nodes of the PLMN over the public wide area network.

25. A mobile communications network as claimed in claim 24, wherein, in the event of a handover from the other of the network nodes of the PLMN to the access point, the other of the network nodes of the PLMN is adapted to send handover information to the core network anchor node, and the core network anchor node is adapted to send handover information to the access point.

26. A mobile communications network as claimed in claim 25, wherein the core network anchor node is adapted to send the handover information to the access point over the public wide area network embedded in a Session initiation Protocol (SIP) message.

27. A mobile communications network as claimed in claim 25, wherein the core network anchor node is adapted to send the handover information to the access point over the public wide area network embedded in a Unlicensed Mobile Access (UMA) message.

28. A mobile communications network as claimed in claim 24, wherein, in the event of a handover from the access point to another of the network nodes of the PLMN, the core network anchor node is adapted to send handover information to the other of the network nodes of the PLMN, and thereafter is adapted to send a handover message to the access point.

29. A mobile communications network as claimed in claim 28, wherein the core network anchor node is adapted to send the handover message to the access point over the public wide area network embedded in a SIP message.

30. A mobile communications network as claimed in claim 28, wherein the core network anchor node is adapted to send the handover message to the access point over the public wide area network embedded in a UMA message.

31. A mobile communications network as claimed in claim 24, wherein, in the event of a handover of a User Equipment (UE) from the access point to the other of the network nodes of the PLMN, the access point is adapted to generate a new call to the PLMN to reach the UE now moved under PLMN coverage and reconnects the call to the other party.

32. A core network node for use in a mobile communications network comprising a Public Land Mobile Network (PLMN), wherein the core network node comprises an IP Multimedia Subsystem-Mobile Switching Centre (IMS-MSC),
wherein the IMS-MSC is adapted to establish a tunneling connection over a public wide area network to an access point, serving as a basestation in the mobile communications network and configured to establish a tunneling connection over a public wide area network to the core network anchor node,
wherein the access point has a Universal Subscriber Identity Module (USIM) interface, with a tunneling connection to the core network anchor node while the access point is active, such that the core network anchor node is able to send handover information to the access point using said tunneling connection, without requiring a mobile device to perform a registration procedure with the access point before handover from the other of the network nodes of the PLMN to the access point,
wherein the core network node is configured to establish signaling and bearer connections with the access point,
wherein the IMS-MSC is adapted to establish connections over MAP interfaces to other network nodes of the PLMN, and wherein the IMS-MSC provides an interworking function between the functions of the IMS-MSC and the MAP interfaces, such that, in the event of a handover between the access point and another of the network nodes of the PLMN, handover information is sent between the access point and the IMS-MSC over the public wide area network.

33. A method of achieving a handover in mobile communications network, wherein the mobile communications network comprises:
 a PLMN, having a plurality of network nodes,
 a core network anchor node, wherein the core network anchor node is connected to said network nodes by MAP interfaces, and
 an access point, serving as a basestation in the mobile communications network, wherein the basestation is connected over a public wide area network to the core network anchor node, wherein the core network anchor node provides an interworking function between said tunneling connection and said MAP interfaces, and wherein the core network anchor node is configured to establish signaling and bearer connections with the access point, and wherein the access point has a Universal Subscriber Identity Module (USIM) interface, with a tunneling connection to the core network anchor node while the access point is active, such that the core network anchor node is able to send handover information to the access point using said tunneling connection, without requiring a mobile device to perform a registration procedure with the access point before handover from the other of the network nodes of the PLMN to the access point,
 the method comprising, in the event of a handover between the access point and another of the network nodes of the PLMN, sending handover information between the access point and the core network anchor node over the public wide area network.

34. A method as claimed in claim 33, comprising sending information between the access point and the core network anchor node over the public wide area network embedded in respective SIP messages.

35. A method as claimed in claim 33, comprising sending information between the access point and the core network anchor node over the public wide area network embedded in respective UMA messages.

36. A method as claimed in claim 33, wherein the core network anchor node comprises an IMS-MSC, the IMS-MSC being adapted to establish a tunneling connection over a public wide area network to an access point, serving as a basestation in the mobile communications network, such that, in the event of a handover between the access point and another of the network nodes of the PLMN, handover information is sent between the access point and the IMS-MSC over the public wide area network.

37. A method as claimed in claim 33, wherein the core network anchor node comprises a SIP-MSC, the SIP-MSC being adapted to establish a tunneling connection over a public wide area network to an access point, serving as a basestation in the mobile communications network, such that, in the event of a handover between the access point and another of the network nodes of the PLMN, handover information is sent between the access point and the SIP-MSC over the public wide area network.

38. A method as claimed in claim 33, wherein the core network anchor node comprises a L-Generic Access Network Controller (GANC), the L-GANC being adapted to establish a tunneling connection over a public wide area network to an access point, serving as a basestation in the mobile communications network, such that, in the event of a handover between the access point and another of the network nodes of the PLMN, handover information is sent between the access point and the L-GANC over the public wide area network.

39. A method as claimed in claim 33, wherein the access point decides to attempt a handover in case the UE becomes unreachable to the access point during an active call.

40. A method as claimed in claim 33, wherein, in the event of a handover of a User Equipment (UE) from the access point to the other of the network nodes when the UE is in a call with another party, the access point initiates call attempts to the UE via the PLMN, and wherein the access point stops the call attempts to the UE via the PLMN if the UE camps again on access point, generates a new call to the UE and reconnects the call to the other party.

41. A method as claimed in claim 40, wherein the access point plays announcements to the other connected party until the new call to UE is reconnected.

42. A method as claimed in claim 33, wherein a User Equipment is provisioned with a USIM application that performs faster cell reselection of the macro network cell by searching only within a short list of cell IDs specified by the access point.

43. A method as claimed in claim 42, wherein the USIM application automatically answers to the call generated by the access point in order to speed up the reconnection of the call.

* * * * *